(12) United States Patent
Zhang et al.

(10) Patent No.: US 12,161,979 B2
(45) Date of Patent: Dec. 10, 2024

(54) ANTIFOULING POLYMER FOR REVERSE OSMOSIS AND MEMBRANE COMPRISING SAME

(71) Applicant: National University of Singapore, Singapore (SG)

(72) Inventors: Yu Zhang, Singapore (SG); Tai-Shung Chung, Singapore (SG); Sui Zhang, Singapore (SG); Feng Li, Singapore (SG)

(73) Assignee: National University of Singapore, Singapore (SG)

(*) Notice: Subject to any disclaimer, the term of this patent is extended or adjusted under 35 U.S.C. 154(b) by 736 days.

(21) Appl. No.: 17/282,356

(22) PCT Filed: Oct. 10, 2019

(86) PCT No.: PCT/SG2019/050505
§ 371 (c)(1),
(2) Date: Apr. 1, 2021

(87) PCT Pub. No.: WO2020/076240
PCT Pub. Date: Apr. 16, 2020

(65) Prior Publication Data
US 2021/0339206 A1    Nov. 4, 2021

Related U.S. Application Data

(60) Provisional application No. 62/744,362, filed on Oct. 11, 2018.

(51) Int. Cl.
*B01D 69/00*    (2006.01)
*B01D 61/02*    (2006.01)
(Continued)

(52) U.S. Cl.
CPC ........... *B01D 69/12* (2013.01); *B01D 61/025* (2013.01); *B01D 67/0093* (2013.01);
(Continued)

(58) Field of Classification Search
CPC .... B01D 69/125; B01D 61/025; B01D 69/02; B01D 69/08; B01D 71/40; B01D 71/56;
(Continued)

(56) References Cited

U.S. PATENT DOCUMENTS

| 3,671,502 A | 6/1972 | Samour et al. |
| 4,277,344 A | 7/1981 | Cadotte |

(Continued)

FOREIGN PATENT DOCUMENTS

| CN | 103157388 A | 6/2013 |
| CN | 103285753 B | 10/2014 |
| CN | 103990385 B | 4/2016 |

OTHER PUBLICATIONS

Meng et al. (Surface coating on the polyamide Tfc Ro membrane for chlorine resistance and antifouling performance improvement ), Journal of Membrane Science, 451 (2014) pp. 205-215 (Year: 2014).*

(Continued)

*Primary Examiner* — Taiwo Oladapo
(74) *Attorney, Agent, or Firm* — Thomas Horstemeyer, LLP

(57) ABSTRACT

The present invention provides a composite membrane suitable for liquid-liquid filtration/reverse osmosis. The invention also provides a copolymer useful in the composite membrane, the copolymer comprising an anchoring repeating unit and a foulant-repelling repeating unit, as well as methods for preparing the composite membrane and copolymers. In a preferred embodiment, a copolymer (P[SBMA-co-HEMA]) is synthesized via the free radical copolymer- (Continued)

ization of a zwitterionic monomer of sulfobetaine methacrylate (SBMA) and an anchoring monomer of hydroxyl ethyl methacrylate (HEMA).

11 Claims, 12 Drawing Sheets

(51) Int. Cl.
| | |
|---|---|
| B01D 67/00 | (2006.01) |
| B01D 69/02 | (2006.01) |
| B01D 69/08 | (2006.01) |
| B01D 69/12 | (2006.01) |
| B01D 71/56 | (2006.01) |
| C02F 1/44 | (2023.01) |
| C02F 103/08 | (2006.01) |
| C08F 220/38 | (2006.01) |

(52) U.S. Cl.
CPC ............ B01D 69/02 (2013.01); B01D 69/08 (2013.01); B01D 69/1251 (2022.08); B01D 71/56 (2013.01); C02F 1/441 (2013.01); B01D 2325/04 (2013.01); B01D 2325/18 (2013.01); B01D 2325/20 (2013.01); B01D 2325/48 (2013.01); C02F 2103/08 (2013.01); C08F 220/387 (2020.02)

(58) Field of Classification Search
CPC ............ B01D 2325/02; B01D 2325/04; B01D 2325/18; B01D 2325/20; B01D 2325/48; B01D 69/1214; B01D 2321/16; B01D 2323/38; B01D 65/08; B01D 67/00933; B01D 69/1251; B01D 71/80; B01D 2323/36; B01D 67/0093; B01D 71/82; C02F 1/441; C02F 2103/08; C08F 220/387

See application file for complete search history.

(56) References Cited

U.S. PATENT DOCUMENTS

| | | | |
|---|---|---|---|
| 9,895,470 | B2 | 2/2018 | Li et al. |
| 2012/0048799 | A1 | 3/2012 | Na et al. |
| 2012/0241373 | A1 | 9/2012 | Na et al. |
| 2013/0306550 | A1* | 11/2013 | Jeong ..................... B01D 71/76 427/244 |
| 2016/0074816 | A1 | 3/2016 | Ginic-Markovic et al. |
| 2016/0121533 | A1 | 5/2016 | Zhang et al. |
| 2016/0303523 | A1 | 10/2016 | Alexiou et al. |
| 2018/0030380 | A1 | 2/2018 | Hellmuth et al. |

OTHER PUBLICATIONS

Microstructure and Performance of Zwitterionic Polymeric Nanoparticle/Polyamide thin-film Nanocomposite Membranes for Salts/Organics Separation, Journal of Membrane Science, 2017.
Improved Antifouling Ability of Thin Film Composite Polyamide Membrane Modified by a pH-Sensitive Imidazole-based zwitterionic Polyelectrolyte, Journal of Membrane Science, 2018.
Novel Thin-Film Composite Nanofiltration Membranes Consisting of a Zwitterionic Co-Polymer for Selenium and Arsenic Removal, Journal of Membrane Science, 2018.
Highly Permeable and Fouling-Resistant Hollow Fiber Membranes for Reverse Osmosis, Chemical Engineering Science, 2019.
Elimelech et al., "The Future of Seawater Fesalination: Energy, Technology, and the Environment", www.sciencemag.org/cgi/content/full/333/6043/712/DC1, vol. 333, pp. 712-717.
Karan et al., "Sub-10 nm polyamide nanofilms with ultrafast solvent transport for molecular spearation", doi: 10.1126/science.aaa5058.
Park et al., "Maximizing the right stuff: The trade-off between membrane permeability and selectivity", DOI: 10.1126/science.aab0530.
Tan et al., "Polyamide membranes with nanoscale Turing structures for water purification", DOI:10.1126/science.aar6308.
Chowdhury et al., "3D printed polyamide membranes for desalination", DOI: 10.1126/science.aar2122.
Greenlee et al., "Reverse osmosis desalination: Water sources, technology, and today's challenges", doi:10.1016/j.watres.2009.03.010.
Kang et al., "Development of antifouling reverse osmosis membranes for water treatment: A review", doi:10.1016/j.watres.2011.11.041.
International Search Report and Written Opinion for International Application No. PCT/SG2019/050505.
International Preliminary Report for International Application No. PCT/SG2019/050505.
Chinese Office Action for Application No. 201980066774.5.
Yang et al., "Biomimetic Silicification on Membrane Surface for Highly Efficient Treatments of Both Oil-in-Water Emulsion and Protein Wastewater", DOI: 10.1021/acsami.8b09218.
Gu et al., "Molecular Layer-by-Layer Assembled Thin-Film Composite Membranes for Water Desalination", DOI: 10.1002/adma.201302030.
Banerjee et al., Antifouling Coatings: Recent Developments in the Design of Surfaces That Prevent Fouling by Proteins, Bacteria, and Marine Organisms, DOI: 10.1002/adma.201001215.
Jiang et al., Ultralow-Fouling, Functionalizable, and Hydrolyzable Zwitterionic Materials and Their Derivatives for Biological Applications, DOI: 10.1002/adma.200901407.
Yang et al., "Synergistic Prevention of Biofouling in Seawater Desalination by Zwitterionic Surfaces and Low-Level Chlorination", DOI: 10.1002/adma.201304386.
Shao et al., "Molecular Understanding and Design Zwitterionic Materials", DOI: 10.1002/adma.201404059.
Jiang et al., "Water Transport through Ultrathin Polyamide Nanofilms Used for Revere Osmosis", DOI: 10.1002/adma.201705973.
Mudler, "Basic Principle of Membrane Technology", DOI 10.1007/978-94-017-0835-7.
Zhang et al., "Thermally evolved and boron bridged graphene oxide (GO) framework constructed on microporous hollow fiber substrates for water and organic matters separation", http://dx.doi.org/10.1016/j.carbon.2017.07.054.
Zhang et al., "Design of robust hollow fiber membranes with high power density for osmotic energy productions", http://dx.doi.org/10.1016/j.cej.2013.10.063.
Yang et al., "Surface-Tethered Zwitterionic Utlrathin Antifouling Coatings on Reverse Osmosis Membranes by Intiated Chemical Vapor Deposition", dx.doi.org/10.1021/cm1031392.
Rana et al., "Surface Modifications for Antifouling Membranes", DOI: 10.1021/cr800208.
Zhang et al., "Antifouling snhancement of polyimide membrane by grafting DEDA-PS zwitterions", https://doi.org/10.1016/j.chemosphere.2018.01.120.
Mezher et al., "Techno-economic assessment and environmental impacts of desalination technologies", doi: 10.1016/j.desal.2010.08.035.
Asadollahi et al., "Enhancement of surface properties and performance of reverse osmosis membranes after surface modification: A review", http://dx.doi.org/10.1016/j.desal.2017.05.027.
Cohen-Tanugi et al., "Quantifying the potential of ultra-permeable membranes for water desalination", DOI: 10.1039/c3ee43221a.
Van der Bruggen et al., "A Review of Pressure-Driven Membrane Processes in Wastewater Treatment and Drinking Water Production", vol. 22, No. 1, Environmental Progress, Apr. 2003, pp. 46-56.
Mi et al., "Gypsum Scaling and Cleaning in Forward Osmosis: Measurements and Mechanisms", DOI: 10.1021/es903623r.
Do et al., "Degradation of Polyamide Nanofiltration and Reverse Osmosis Membranes by Hypochlorite", dx.doi.org/10.1021/es203090y.
Ma et al., "Interfacial Polymerization with Electrosprayed Microdroplets: Toward Controllable and Ultrathin Polyamide Membranes", DOI: 10.1021/acs.estlett.7b00566.

(56) References Cited

OTHER PUBLICATIONS

Kumar et al., "Investigation of Seawater Reverse Osmosis Fouling and Its Relationship To Pretreatment Type", DOI: 10.1021/es0512428.

Chen et al., "Strong Resistance of Phosphorylcholine Self-Assembled Monolayers to Protein Adsorption: Insights into Nonfouling Properties of Zwitterionic Materials", DOI: 10.1021/ja054169u.

"Tackling the biofouling challenge in SWRO", Global Water Intelligence, vol. 12, Issue 4, https://kremesti.com/water/articles/tackling_the_biofouling_challenge_SWRO.htm.

Bartels et al., "Integrated Membrane System for Low Fouling RO Desalting of Municipal Wastewater", Aug. 2004, pp. 1-56.

Liu et al., "Antifouling Thin-Film Composite Membranes by Controlled Archiecture of Zwitterionic Polymer Brush Layer", DOI: 10.1021/acs.est.6b05992.

Zeng et al., "Synthesis and Drug-Release Studies of Low-Fouling Zwitterionic Hydrogels with Enchanced Mechanical Strength", DOI: 10.1002/app.41041.

Li et al., "Recent developments in reverse osmosis desalination membranes", DOI: 10.1039/b924553g.

Lee et al., "A review of reverse osmosis membrane materials for desalination-Development to date and future potential", doi:10.1016/j.memsci.2010.12.036.

Ni et al., "Surface coating on the polyamide Tfc Ro membrane for chlorine resistance and antifouling performance improvement", http://dx.doi.org/10.1016/j.memsci.2013.09.040.

Choi et al., "Three-dimensional hydraulic modeling of perticle deposition on the patterned isopore membrane in crossflow microfiltration", http://dx.doi.org/10.1016/j.memsci.2015.05.054.

Xu et al., "Effect of membrane fouling on transport of organic contaminants in NF/RO membrane applications", doi:10.1016/j.memsci.2005.12.001.

Zhoa et al., "Highly hydrophilic and low-protein-fouling polypropylene membrane prepared by surface modification with sulfobetaine-based zwitterionic polymer through a combined surface polymerization method", doi: 10.1016/j.memsci.2010.06.037.

Ang et al., "Fouling and cleaning of RO membranes fouled by mixtures of organic foulants simulating wastewater effluent", doi: 10.1016/j.memsci.2011.04.020.

Zhoa et al., "Synthesis of robust and high-performance aquaporin-based biomimetic membranes by interfacial polymerization-membrane preparation and RO performance characterization", http://dx.doi.org/10.1016/j.memsci.2012.08.039.

Wang et al., Mechanically robust and highly permeable AquaporinZ biomimetic membranes, http://dx.doi.org/10.1016/j.memsci.2013.01.031.

Nikkola et al., "Surface modification of thin film composite RO membrane for enhanced anti-biofouling performance", http://dx.doi.org/10.1016/j.memsci.2013.05.032.

Yu et al., "Grafting polyzwitterions onto polyamide by click chemistry and nucleophilic substitution on nitrogen: A novel approach to enhance membrane fouling resistance", http://dx.doi.org/10.1016/j.memsci.2013.08.022.

Duan et al., "Preperation and water desalination properties of POSS-polyamide nanocomposite reverse osmosis membranes", http://dx.doi.org/10.1016/j.memsci.2014.09.022.

Wan et al., "Osmotic power generation by pressure retarded osmosis using seawater brine as the draw solution and wastewater retentate as the feed", http://dx.doi.org/10.1016/j.memsci.2014.12.036.

Cai et al., "Zwitterionic polymers grafted poly(ethersulfone)hollow fiber membranes and their antifouling behaviors for osmotic power generation", http://dx.doi.org/10.1016/j.memsci.2015.09.037.

Qi et al., "Aquaporin-based biomimetic reverse osmosis membranes: Stability and long term persormance", http://dx.doi.org/10.1016/j.memsci.2016.02.013.

Sun et al., "Segregation-induced in situ hydrophilic modification of poly (vinylidene fluoride) ultrafiltration membranes via sticky poly (ethylene glycol) blending", https://doi.org/10.1016/j.memsci.2018.05.046.

Yang et al., "Surface hydrophilization of microporous polyproylene membrane by grafting zwitterionic polymer for anti-biofouling", doi: 10.1016/j.memsci.2010.06.048.

Zhang et al., "A facile method for polyamide membrane modification by poly(sulfobetaine methacrylate) to improve fouling resistance", http://dx.doi.org/10.1016/j.memsci.2013.06.013.

Barroso et al., "Antifouling performance of poly(axrylonitrile)-based membranes: From green synthesis to application", doi: 10.1016/j.supflu.2010.10.035.

Schlenoff, "Zwitteration: Coating Surfaces with Zwitterionic Functionality to Reduce Nonspecific Adsorption", dx.doi.org/10.1021/la500057j.

Wang et al., "Nanoparticle-templated nanofiltration membranes for ultrahigh performance desalination", DOI: 10.1038/s41467-018-04467-3.

Vorosmarty et al., "Global threats to human water security and river biodiversity", doi: 10.1038/nature09440.

Chen et al., "Surface hydration: Principles and applications toward low-fouling/nonfouling biomaterials", doi:10.1016/j.polymer.2010.08.022.

Khorshidi et al., "A Novel Approach Toward Fabrication of High Performance Thin Film Composite Polyamide Membranes", DOI: 10.1038/srep22069.

\* cited by examiner

COP2   PAMAM G2

ANTIFOULING POLYMER FOR REVERSE OSMOSIS AND MEMBRANE COMPRISING SAME

CROSS-REFERENCE TO RELATED APPLICATION

This application is the 35 U.S.C. § 371 national stage application of PCT Application No. PCT/SG2019/050505, filed Oct. 10, 2019, where the PCT claims priority to and the benefit of, U.S. Patent Application No. 62/744,362, filed Oct. 11, 2018, both of which are herein incorporated by reference in their entireties.

FIELD OF INVENTION

The present invention relates to an antifouling polymer, to a composite membrane for reverse osmosis which comprises the antifouling polymer, and to methods for preparing the antifouling polymer and composite membrane.

BACKGROUND

The listing or discussion of a prior-published document in this specification should not necessarily be taken as an acknowledgement that the document is part of the state of the art or is common general knowledge.

Desalination is an important process for the preparation of fresh water, especially in arid coastal areas such as the Middle East. One method for desalination is reverse osmosis (RO), which currently dominates the worldwide desalination market due to its relatively low energy consumption. Reverse osmosis also plays an important role in water treatment and reuse.

Reverse osmosis involves the use of a semi-permeable membrane which allows the passage of water through it, but rejects dissolved solutes, such as sodium chloride. The process relies on the use of a high pressure on the solute side of the membrane, which increases the solvent (water) pressure on the solute side of the membrane, allowing the flow of solvent (water) against the osmotic gradient.

One significant issue in reverse osmosis processes is fouling of the semi-permeable membrane. The attachment and agglomeration of various foulants (e.g. organic, inorganic and biological foulants) onto the membrane surface reduces the flux of water through the membrane. This can result in higher operating pressure, the necessity for frequent chemical cleaning, and reduced membrane operating life. All of these factors greatly increase the operational cost.

Existing methods to modify reverse osmosis membranes to provide improved anti-fouling properties usually involve complicated synthesis procedures and/or multi-step processes, meaning that they are not suitable for large scale production. In addition, most physical or chemical modifications reduce the water flux rate through the membrane. Therefore, there is a need for a reverse osmosis membrane that is resistant to fouling and can maintain high water flux rates. In addition, there is a need for a reverse osmosis membrane that can be prepared by an environmentally friendly and scalable method.

SUMMARY OF INVENTION

It has surprisingly been found that conjugating a copolymer comprising zwitterionic monomers to a membrane provides the membrane with beneficial antifouling properties. Without wishing to be bound by theory, zwitterionic groups are believed to repel common foulants such as organic, inorganic and biological foulants. This prevents accumulation of such foulants on the membrane surface, which would otherwise lead to reduced water flux rates. Copolymers having zwitterionic monomers can be conjugated to a membrane via covalent bonds through functional groups present in the copolymer (e.g. present on monomers other than the zwitterionic monomers).

It has also surprisingly been found that the copolymers disclosed herein can covalently bond to loose polymer chains on a membrane, removing these loose chains from the membrane surface. This reduces the thickness of the membrane and assists the formation of pores on the membrane surface, both of which increase the water permeability of a membrane, without reducing the salt/ion rejection properties of the membrane.

This approach enables the provision of membranes having pure water permeability of up to 10 LMH bar$^{-1}$, NaCl rejection of ~98%, and a high resistance to alginate and protein fouling when tested with a feed from a reverse osmosis plant over 10 days.

Therefore, a first aspect of the invention provides the following.

1. A composite membrane material suitable for liquid-liquid filtration comprising:
   a porous polymeric substrate material having a first and second surface;
   a thin film layer attached to the first surface of the substrate composed of a three dimensional polyamide network; and
   a copolymer covalently attached to the thin film layer, wherein:
   the copolymer has a polymeric backbone and comprises first and second repeating units, where the first repeating units provide the polymer with zwitterionic functional groups pendant to the polymeric backbone and the second repeating units provide the polymer with functional groups suitable to form a covalent bond with the three dimensional polyamide network.

2. The membrane according to Clause 1, wherein the substrate material is selected from polyethersulfone, polysulfone, polyphenylsulfone, polyacrylonitrile, polyimide, polyether imide, polyamide-imde, polyvinylidene fluoride, cellulose triacetate, polyetherketone, or polyetheretherketone, optionally wherein the substrate material has a thickness of from 10 to 10000 µm, such as from 50 to 1000 µm, such as from 100 to 300 µm.

3. The membrane according to Clause 1 or Clause 2, wherein the three dimensional polyamide network is formed from a polyamide material which is an aliphatic and/or aromatic polyamide, optionally wherein the aliphatic and/or aromatic polyamide comprises one or more substituents selected from the group consisting of halo, silyl and siloxane groups.

4. The membrane according to Clause 3, wherein the three dimensional polyamide network is formed by the reaction of a compound comprising two or more (e.g. 2, 3, 4, or 5) activated carboxylic acid groups and a compound comprising two or more amino groups (e.g. 2, 3, 4 or 5), optionally wherein:
   (a) the compound comprising two or more activated carboxylic acid groups is an aliphatic or aromatic polyacyl halide, which is unsubstituted or substituted by one or more substituents selected from the group consisting of halo, silyl, and siloxane groups (e.g. the compound comprising two or more activated carboxylic acid groups is selected from the group consisting of one or more of trimesoyl chloride, iso-phthaloyl dichloride, and sebacoyl chloride);
(b) the compound comprising two or more amino groups is an aliphatic or aromatic polyamine that is unsubstituted or substituted with one or more substituents selected from the group consisting of halo, silyl, and siloxane groups.
5. The membrane according to Clause 4, wherein the three dimensional polyamide network is formed by the reaction of m-phenylenediamine and trimesoyl chloride.
6. The membrane according to any one of the preceding clauses, wherein the thin film layer has a thickness of from 1 to 10000 nm, such as from 20 to 1000 nm, such as from 50 to 500 nm.
7. The membrane according to any one of the preceding clauses, wherein the membrane has a water permeability value of from 2.0 to 10.0 L $m^{-2}$ $h^{-1}$ $bar^{-1}$ and/or a NaCl rejection value greater than 97%.
8. The membrane according to any one of the preceding clauses, wherein the copolymer is a random copolymer or a block copolymer (e.g. a random copolymer).
9. The membrane according to any one of the preceding clauses, wherein the first repeating unit is selected from a monomer of acrylate or methacrylate, with a pendant side-chain that comprises a zwitterionic functional group selected from the group consisting of sulfobetaine, carboxybetaine, sulfopyridinium betaine, phosphorylcholine, cysteine, sulfobetaine siloxane.
10. The membrane according to any one of the preceding clauses, wherein the second repeating unit is selected from a monomer of acrylate or methacrylate, with a pendant side-chain that comprises a functional group selected from OH or $NH_2$ optionally wherein the pendant side chain comprises OH.
11. The membrane according to any one of the preceding clauses, wherein the molar ratio of the first repeating unit to the second repeating unit is from 0.01 to 10000:1, such as from 1:1 to 50:1, such as from 2:1 to 23:1, such as 5:1.
12. The membrane according to any one of the preceding clauses, wherein the copolymer has formula (I):

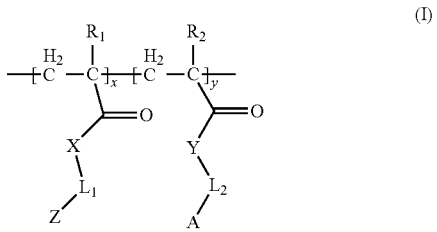

(I)

where:
x represents the first repeating unit and y represents the second repeating unit, where the molar ratio of repeating unit x to repeating unit y is from 0.01 to 10000:1;
$R_1$ and $R_2$ are independently H or $C_{1-6}$ alkyl;
X and Y are independently NH, O or S;
$L_1$ and $L_2$ are independently a $C_{1-6}$ alkyl group;
Z is a zwitterionic group; and
A is an anchoring group selected from OH or $NH_2$.

13. The membrane according to Clause 12, wherein:
(a) the zwitterion moiety defined by X-$L_1$-Z in Clause 12, is selected from:

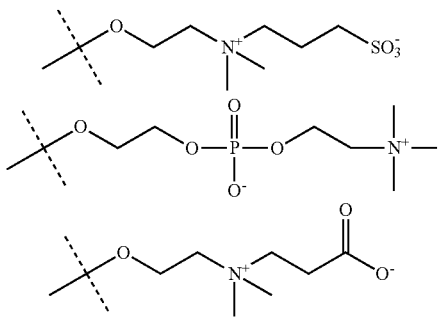

and salts or solvates thereof, where the dotted line represents the point of attachment to the rest of the molecule; and/or
(b) the anchoring moiety defined by Y-$L_2$-A in Clause 12, is selected from:

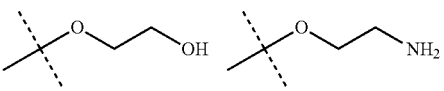

and salts or solvates thereof, where the dotted line represents the point of attachment to the rest of the molecule.
14. The membrane according to any one of the preceding clauses, wherein the substrate has a self-supporting hollow fiber configuration or a flat sheet configuration.

The present invention also provides copolymers useful in the membranes of the invention. Thus, a second aspect of the invention provides the following.

15. A copolymer of formula (I):

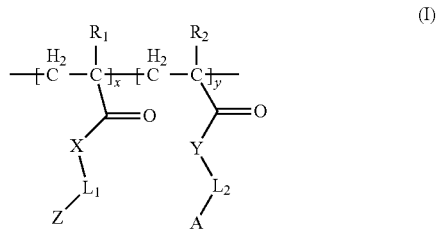

(I)

where:
x represents a first repeating unit and y represents a second repeating unit of the copolymer,
$R_1$ and $R_2$ are independently H or $C_{1-6}$ alkyl;
X and Y are independently NH, O or S;
$L_1$ and $L_2$ are independently a $C_{1-6}$ alkyl group;
Z is a zwitterionic group; and
A is an anchoring group selected from OH or $NH_2$.

16. The copolymer according to Clause 15, wherein the molar ratio of repeating unit x to repeating unit y is from 0.01 to 10000:1, such as from 1:1 to 50:1, such as from 2:1 to 23:1, such as 5:1.

17. The copolymer according to Clause 15 or Clause 16, wherein the zwitterionic group is selected from the group consisting of sulfobetaine, carboxybetaine, sulfopyridinium betaine, phosphorylcholine, cysteine, sulfobetaine siloxane.

18. The copolymer according to any one of Clauses 15 to 17, wherein:
(a) the zwitterion moiety defined by X-L$_1$-Z in Clause 12, is selected from:

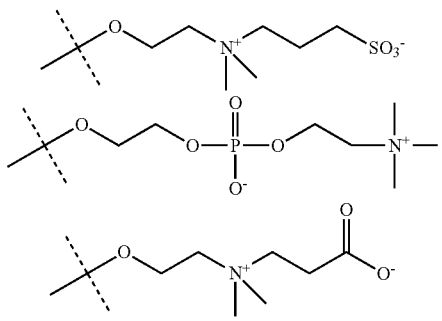

and salts or solvates thereof, where the dotted line represents the point of attachment to the rest of the molecule; and/or
(b) the anchoring moiety defined by Y-L$_2$-A in Clause 12, is selected from:

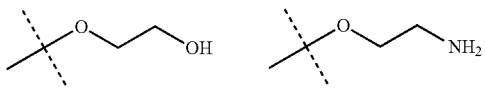

and salts or solvates thereof, where the dotted line represents the point of attachment to the rest of the molecule.
19. The copolymer according to any one of Clauses 15 to 18, wherein the copolymer is a random copolymer or a block copolymer (e.g. a random copolymer).

Also provided by the present invention are methods for preparing the copolymers of the invention. Thus, a third aspect of the invention provides the following.

20. A method of preparation of a copolymer as described in any one of Clauses 1 to 19, wherein the process comprises the step of reacting an aqueous mixture of a first monomer with a second monomer in the presence of an initiator to form the copolymer in a reaction vessel, wherein:
the first monomer and second monomer are compatible monomers capable of forming a polymeric backbone with each other;
the first monomer comprises zwitterionic functional groups;
the second monomer comprises functional groups capable of forming a covalent bond (e.g. capable of forming a covalent bond with an acyl halide or the like).
21. The method according to Clause 20, wherein the molar ratio of the first monomer to the second monomer is from 0.01 to 10000:1, such as from 1:1 to 50:1, such as from 2:1 to 23:1, such as 5:1.
22. The method according to Clause 20 or Clause 21, wherein:
(a) the mass ratio of the initiator to the total mass of the first and second monomers is from 1:2 to 1:10000, such as from 1:1 to 1:1000, such as from 1:10 to 1:100, such as about 1:60; and/or
(b) the reaction temperature in step is from 30 to 100° C., such as from 50 to 80° C., such as 70° C.; and/or
(c) the reaction is conducted for a period of from 6 h to 30 h, such as around 18 h.
23. The method according to any one of Clauses 20 to 22, wherein the weight:weight ratio of the total weight of the monomers to water is from 1 to 50 wt. %, such as from 2 to 25 wt. %, such as from 5 to 10 wt. %, such as around 7.2 wt. %.
24. The method according to any one of Clauses 20 to 23, wherein the reaction is quenched by cooling the reaction vessel.

Also provided by the present invention are methods for preparing the membranes of the invention. Thus, a fourth aspect of the invention provides the following.

25. A method of manufacture of a composite membrane material as described in any one of Clauses 1 to 14, wherein the process comprises the steps of:
(a) providing a thin film composite comprising a porous polymeric substrate material having a first and second surface and a thin film layer attached to the first surface of the substrate composed of a three dimensional polyamide network, the three dimensional polyamide network comprising a functional group suitable to form a covalent bond; and
(b) providing a copolymer that has a polymeric backbone and comprises first and second repeating units, where the first repeating units provide the polymer with zwitterionic functional groups pendant to the polymeric backbone and the second repeating units provide the polymer with functional groups that are suitable to form a covalent bond with the thin film polyamide layer; and
(c) contacting the thin film composite with a solution comprising the copolymer for a period of time sufficient to form a covalent bond between the three dimensional polyamide network and the copolymer.
26. The method according to Clause 25, wherein the copolymer in the copolymer solution in step (c) has a concentration of from 0.02 (wt./vol) % to 7.2 (wt./vol) %, such as 2.4 (wt./vol) %.
27. The method according to Clause 25 or Clause 26, wherein the period time in step (c) is from 2 seconds to 1 hour, such as from 30 seconds to 30 minutes, such as 45 seconds to 5 minutes, such as 2 minutes.
28. The method according to any one of Clauses 25 to 27, wherein after step (c), the composite membrane material is exposed to a solution containing hypochlorite ion at around neutral pH for a period of time sufficient to obtain a membrane having improved flux and similar salt passage as compared to the same untreated membranes.
29. The method according to Clause 28, wherein the hypochlorite ion is provided at a concentration of from 200 to 10,000 ppm, such as 4,000 ppm in the hypochlorite solution.
30. The method according to Clause 28 or Clause 29, wherein the period of time is from 0.5 h to 10 h, such as 6 h.
31. The method according to any one of Clauses 25 to 30, wherein the composite membrane materials are stored and transported in deionized water at from 10 to 40° C. before use.
32. The method according to any one of Clauses 25 to 30, wherein the copolymer is provided by the process described in any one of Clauses 20 to 24.
33. The method according to Clause 32, wherein the copolymer is formed as described in Clause 24 and the cooled reaction mixture containing the copolymer is diluted to a concentration of from 0.02 (wt./vol) % to 7.2 (wt./vol) %, such as 2.4 (wt./vol) % for use in step (c).

The membranes of the invention are useful in the filtration of liquids. Thus, a fifth aspect of the invention provides the following.

34. A method of liquid-liquid filtration using a composite membrane material according to any one of Clauses 1 to 15.

35. The method according to Clause 34, wherein the method of liquid-liquid filtration is reverse osmosis, loose reverse osmosis, nanofiltration or ultrafiltration.

36. The method according to Clause 34 or Clause 35, wherein the method uses a transmembrane pressure of from 1 bar to 50 bar, such as from 1 bar to 20 bar.

37. The method according to Clause 34 or Clause 36, wherein the method of reverse osmosis or loose reverse osmosis uses a water source selected from the group consisting of fresh water, synthetic brackish water, and waste water retentate.

DETAILED DESCRIPTION

Figure 1:
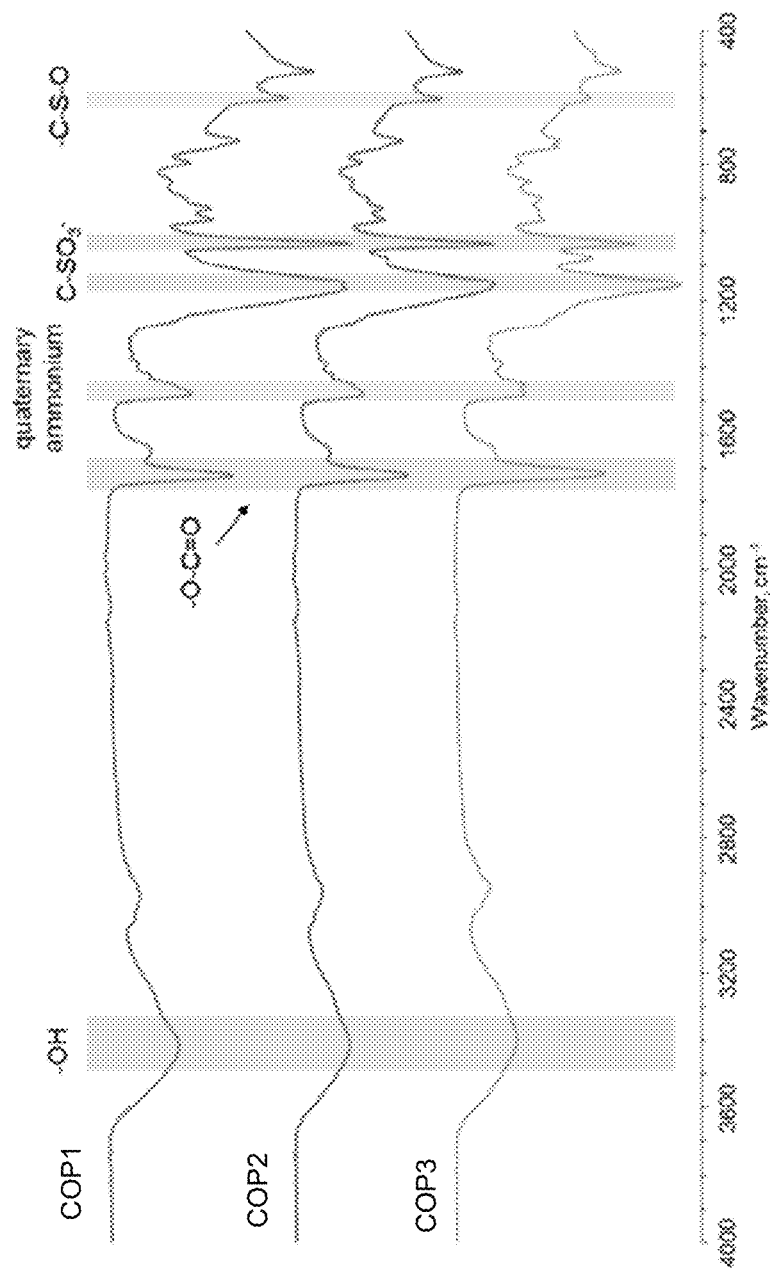
FIG. 1 shows FTIR spectra of the COP1, COP2 and COP3 copolymers prepared according to Example 1.

As used herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

Membranes

In a first aspect of the invention there is provided a composite membrane material suitable for liquid-liquid filtration comprising:
- a porous polymeric substrate material having a first and second surface;
- a thin film layer attached to the first surface of the substrate composed of a three dimensional polyamide network; and
- a copolymer covalently attached to the thin film layer, wherein:
    the copolymer has a polymeric backbone and comprises first and second repeating units, where the first repeating units provide the polymer with zwitterionic functional groups pendant to the polymeric backbone and the second repeating units provide the polymer with functional groups suitable to form a covalent bond with the three dimensional polyamide network.

The membranes of the invention are suitable for liquid-liquid filtration. As used herein, "liquid-liquid filtration" refers to the filtration of a liquid through a selectively-permeable membrane to purify the liquid. The purification can involve the removal of undesirable species in a feed liquid, for example the removal of suspended solid species, dissolved species such as ions, biological matter such as microbes, and colloidal species present in the feed. In particular embodiments of the invention, the membranes may be suitable for the removal of ionic species dissolved in water, for example dissolved NaCl. In particular embodiments of the invention, the membranes may be suitable for the removal of biological species dissolved in water, for example dissolved albumin. In such embodiments the membranes may reject at least 95%, such as at least 97%, at least 98%, at least 99% or at least 99.5% of the dissolved ionic or biological species, (e.g. NaCl or albumin).

The membranes of the invention comprise a porous polymeric substrate material having a first and second surface. The porous polymeric substrate can be any porous polymer onto which the thin film layer can be attached, which porous polymer must be porous to liquid (i.e. the porous polymer must allow liquid to pass through it). The porous polymeric substrate may be porous to aqueous liquids and/or organic liquids, for example polar or non-polar organic liquids. In particular embodiments described herein, the porous polymeric substrate may be porous to aqueous liquids and/or water.

Any suitable porous polymeric substrate material may be used. Examples of suitable materials include, but are not limited to, polyethersulfone, polysulfone, polyphenylsulfone, polyacrylonitrile, polyimide, polyether imide, polyamide-imde, polyvinylidene fluoride, cellulose triacetate, polyetherketone, polyetheretherketone, and combinations thereof. In a particular embodiment of the invention the substrate material may be a polyethersulfone.

The substrate material may have a thickness of from about 10 to about 10000 μm, such as from about 50 to about 1000 μm, such as from about 100 to about 300 μm.

For the avoidance of doubt, when numerical values are presented in the current application, any suitable combination of the end-points is explicitly contemplated herein. For example, the following substrate thicknesses ranges are contemplated from the above:

from about 10 to about 50 μm, from about 10 to about 100 μm, from about 10 to about 300 μm, from about 10 to about 1000 μm, and from about 10 to about 10000 μm;
from about 50 to about 100 μm, from about 50 to about 300 μm, from about 50 to about 1000 μm, from about 50 to about 10000 μm;
from about 100 to about 300 μm, from about 100 to about 1000 μm, from about 100 to about 10000 μm;
from about 300 to about 1000 μm, from about 300 to about 10000 μm; and
from about 1000 to about 10000 μm.

A thin film layer is attached to a first surface of the porous polymeric substrate. As used herein, the "first surface" is the surface of the porous polymeric substrate that, when the membrane is in use, is on the side of the feed liquid (i.e. the thin film layer is between the porous polymeric substrate and the feed solution). As such, the second surface of the porous polymeric substrate, when in use, is on the side of the purified (e.g. desalinated) liquid.

The thin film layer comprises a three dimensional polyamide network. The three dimensional polyamide network may be permeable to water but impermeable to other species which are intended to be filtered out of a supplied feed (e.g. NaCl). Typically, the polyamide network may be prepared from a reaction between a compound comprising two or more activated carboxylic acid groups and a compound comprising two or more amino groups (e.g. the Schotten-Baumann reaction). This reaction leaves a number of residual activated carboxylic acid groups in the final polyamide network. These activated carboxylic acid groups can react with suitable complementary functional groups present on another compound (e.g. a copolymer comprising complementary functional groups) to attach the other compound to the polyamide network.

Thus, the residual activated carboxylic acid groups can be used to attach compounds having antifouling properties to the polyamide network.

The three dimensional polyamide network can be formed from an aliphatic and/or aromatic polyamide. Each repeating unit of the polyamide may comprise one or more (e.g. 1 to 6, such as 1 to 3) substituents selected from the group consisting of halo, silyl and siloxane groups.

As used herein, "halo" refers to a fluoro, chloro, bromo and iodo group.

As used herein, "silyl" refers to the group —SiR$_3$, where each R independently represents a C$_{1-6}$ alkyl group, a C$_{1-6}$ alkenyl group, a C$_{1-6}$ alkynyl group, a C$_{2-6}$ cycloalkyl group, a C$_{2-6}$ cycloalkenyl group, a C$_{2-6}$ cycloalkynyl group, or a phenyl group, each of which may be substituted by one or two halo groups.

As used herein, "siloxane" refers to the group —OSiR$_3$, where each R independently represents a C$_{1-6}$ alkyl group, a C$_{1-6}$ alkenyl group, a C$_{1-6}$ alkynyl group, a C$_{2-6}$ cycloalkyl group, a C$_{2-6}$ cycloalkenyl group, a C$_{2-6}$ cycloalkynyl group, or a phenyl group, each of which may be substituted by one or two halo groups.

As mentioned above, the three dimensional polyamide network may be prepared from a reaction between a compound comprising two or more (e.g. 2, 3, 4 or 5) activated carboxylic acid groups and a compound comprising two or more (e.g. 2, 3, 4 or 5) amino groups. Example of activated carboxylic acid groups suitable for this reaction include, but are not limited to, acid anhydrides and acyl halides (e.g. acyl chlorides).

The compound comprising two or more activated carboxylic acid groups may be an aliphatic or aromatic polyacyl halide (e.g. an aliphatic or aromatic polyacyl chloride). The aliphatic or aromatic polyacyl halide may be unsubstituted or substituted by one or more (e.g. 1 to 6, such as 1 to 3) substituents. Examples of suitable substituents include halo, silyl, and siloxane groups. In embodiments of the invention the three dimensional polyamide network may be derived from unsubstituted compounds comprising two or more activated carboxylic acid groups. Particular examples of compounds comprising two or more activated carboxylic acid groups useful in the formation of the three dimensional polyamide network include trimesoyl chloride, iso-phthaloyl dichloride, sebacoyl chloride, and combinations thereof.

The compound comprising two or more amino groups may be an aliphatic or aromatic polyamine. The aliphatic or aromatic polyamine may be unsubstituted or substituted with one or more (e.g. 1 to 6, such as 1 to 3) substituents. Examples of suitable substituents include halo, silyl, and siloxane groups.

In a particular embodiment of the invention the three dimensional polyamide network may be formed by the reaction of m-phenylenediamine and trimesoyl chloride.

The thin film layer which comprises the polyamide network typically has a thickness of from 1 to 10000 nm, such as from 20 to 1000 nm, for example from 50 to 500 nm.

The thin film layer may be attached to the substrate by any appropriate mechanism. For example, when the substrate does not contain functional groups which can react with the polyamide, or species used to form the polyamide, the thin film layer may be formed by polymerisation on the surface of the substrate, such that polyamide chains are formed, or can penetrate, into defects on the surface of the substrate (e.g. valleys or holes). This may provide a stable physical anchoring of the thin film layer on the substrate. Alternatively, if the substrate contains (residual) functional groups which can react with the polyamide or species used to form the polyamide, the thin film layer may be covalently attached to the substrate.

The membranes of the invention comprise a copolymer covalently attached to the thin film layer. The copolymer comprises a polymeric backbone comprising at least two repeating units. A first repeating unit provides the polymer with zwitterionic repeating groups pendant to the polymeric backbone and a second repeating unit provides the polymer with functional groups suitable to form a covalent bond with the three dimensional polyamide network. Thus, the copolymer may be covalently attached to the three dimensional polyamide network, for example by covalent bonds between the residual activated carboxylic acid groups and a complementary functional group in the copolymer. Suitable complementary functional groups which may be present on the copolymer include nucleophilic groups such as alcohol (—OH) and amino (—NR$_2$) groups. Generally, the complementary functional groups on the copolymer may be present on the second repeating unit of the copolymer.

The copolymer may be a random copolymer or a block copolymer. The copolymer may be a random copolymer, for example a random copolymer prepared by free-radical polymerisation of a mixture of the monomers.

The first repeating unit in the copolymer has a pendant side-chain that comprises a zwitterionic functional group. Examples of suitable zwitterionic functional groups include, but are not limited to, sulfobetaine, carboxybetaine, sulfopyridinium betaine, phosphorylcholine, cysteine, and sulfobetaine siloxane.

The second repeating unit in the copolymer has functional groups which can form a covalent bond with the three dimensional polyamide network. Typically, the functional groups on the second repeating unit which can form a covalent bond with the three dimensional polyamide network may be present on a pendant side-chain. The functional group may be a nucleophilic functional group which can form a covalent bond with a residual activated carboxylic acid group on the polyamide network, for example OH or NR$_2$, where R is H or a C$_{1-6}$ alkyl group. Typically, the functional group is OH or NH$_2$, more typically OH.

The first repeating unit may be selected from a monomer of acrylate or methacrylate, having an appropriate pendant side-chain. In this case, the second repeating unit will be a repeating unit which can form a polymer backbone with acrylate/methacrylate, and may also be selected from a monomer of acrylate or methacrylate having an appropriate pendant side chain.

The molar ratio of the first repeating unit to the second repeating unit may be from about 0.01 to about 10000:1, such as from about 1:1 to about 50:1, such as from about 2:1 to about 23:1, such as about 5:1.

In embodiments of the invention the copolymer has formula (I):

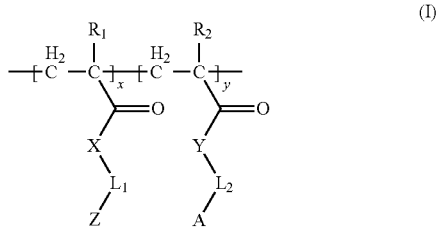

where:
x represents the first repeating unit and y represents the second repeating unit, where the molar ratio of repeating unit x to repeating unity is from about 0.01 to about 10000:1;
R$_1$ and R$_2$ are independently H or C$_{1-6}$ alkyl;
X and Y are independently NH, O or S;
L$_1$ and L$_2$ are independently a C$_{1-6}$ alkyl group;
Z is a zwitterionic group; and
A is an anchoring group selected from OH or NH$_2$.

The zwitterion moiety defined by X-L$_1$-Z in the first repeating unit may be selected from the group consisting of:

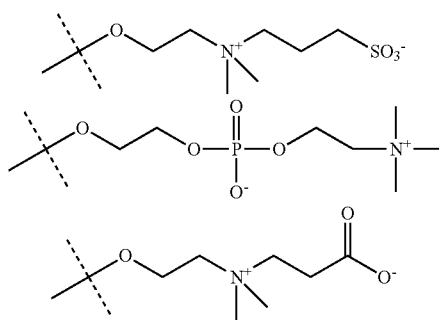

and salts or solvates thereof, where the dotted line represents the point of attachment to the rest of the molecule.

The anchoring moiety defined by Y-L$_2$-A in the second repeating unit may be selected from the group consisting of:

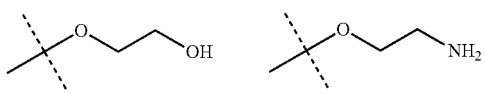

and salts or solvates thereof, where the dotted line represents the point of attachment to the rest of the molecule.

In some embodiments of the invention, the substrate may have a self-supporting hollow fiber configuration or a flat sheet configuration.

In some embodiments of the invention the membrane may have a water permeability value of from 2.0 to 10.0 L m$^{-2}$ h$^{-1}$ bar$^{-1}$ and/or a NaCl rejection value greater than 97%.

Figure 12:
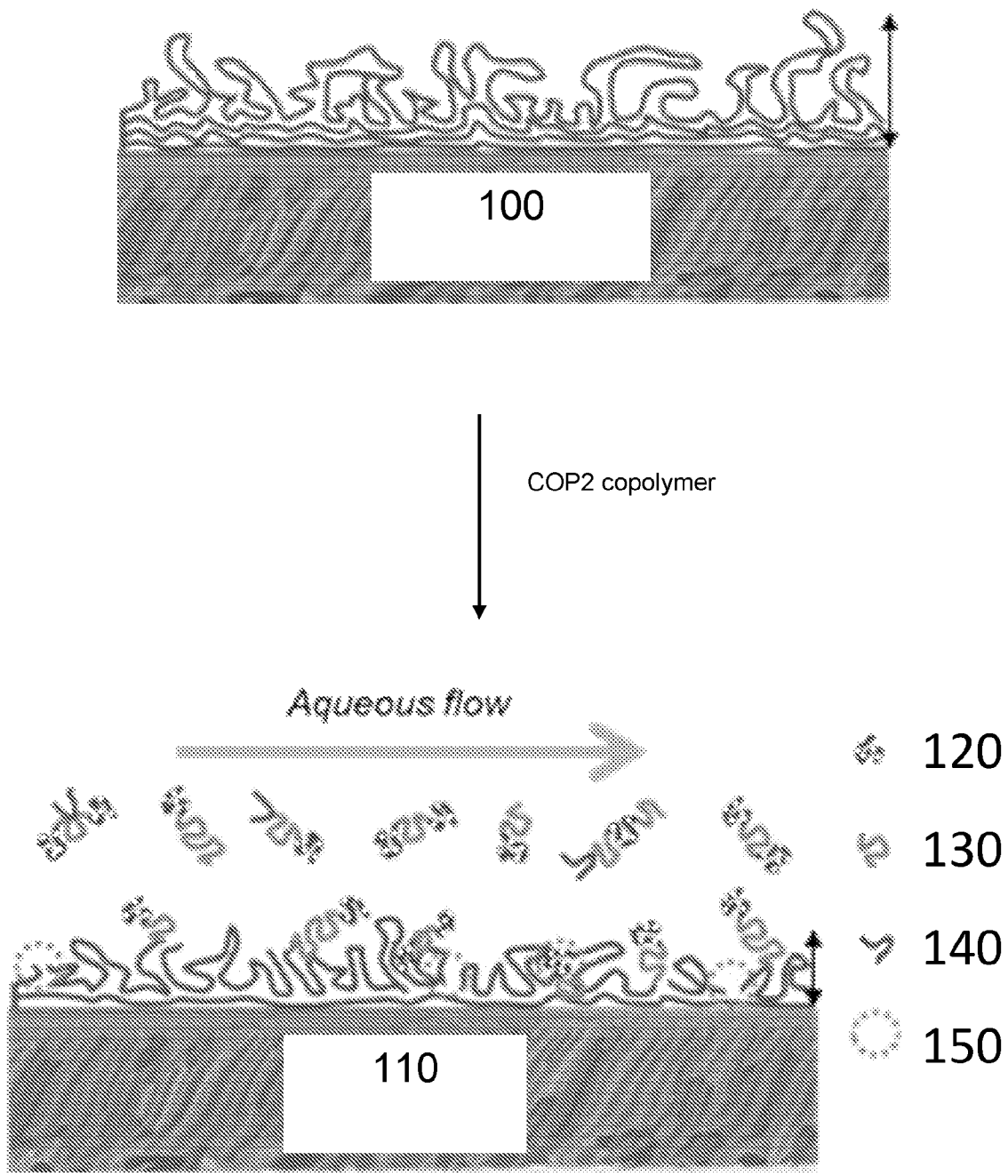
FIG. 12 illustrates the reaction occurring during surface modification of a TFC membrane and a copolymer.

The structure of a membrane of the invention is shown in FIG. 12. A thin film composite membrane 100 is contacted with a solution of copolymer of the invention (e.g. COP2) to form a conjugate membrane 110. The copolymer comprises zwitterionic units 120 and anchoring units 130. The anchoring units 130 can covalently bond to residual activated carboxylic acid groups on the polyamide segments 140. This covalent bonding means that the polymer solution can wash away loose polyamide chains, forming nanopores 150 on the surface of the three dimensional polyamide network, as well as reducing the overall thickness of the membrane. Both of these effects serve to increase the water flux rates through the membrane, but do not reduce the salt rejection properties.

Copolymers

The present invention also provides copolymers which are useful in the composite membranes of the invention. Thus, in a second aspect of the invention there is provided a copolymer of formula (I):

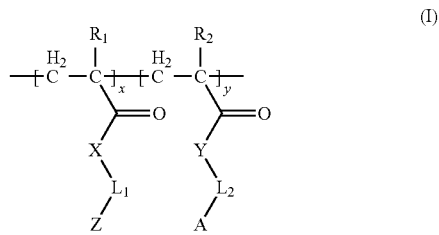

where:
x represents a first repeating unit and y represents a second repeating unit of the copolymer,
$R_1$ and $R_2$ are independently H or $C_{1-6}$ alkyl;
X and Y are independently NH, O or S;
$L_1$ and $L_2$ are independently a $C_{1-6}$ alkyl group;
Z is a zwitterionic group; and
A is an anchoring group selected from OH or $NH_2$.

The copolymer may be a random copolymer or a block copolymer. The copolymer may be a random copolymer, for example a random copolymer prepared by free-radical polymerisation of a mixture of the monomers.

The first repeating unit in the copolymer has a pendant side-chain that comprises a zwitterionic functional group. Examples of suitable zwitterionic functional groups include, but are not limited to, sulfobetaine, carboxybetaine, sulfopyridinium betaine, phosphorylcholine, cysteine, and sulfobetaine siloxane.

The second repeating unit in the copolymer has functional groups which can form a covalent bond with the three dimensional polyamide network. Typically, the functional groups on the second repeating unit which can form a covalent bond with the three dimensional polyamide network may be present on a pendant side-chain. Generally, the functional group may be a nucleophilic functional group which can form a covalent bond with a residual activated carboxylic acid group on the polyamide network, for example OH or $NR_2$, where R is H or a $C_{1-6}$ alkyl group. Typically, the functional group is OH or $NH_2$, more typically OH.

The first repeating unit may be selected from a monomer of acrylate or methacrylate, having an appropriate pendant side-chain. In this case, the second repeating unit may also be a repeating unit which can form a polymer backbone with acrylate/methacrylate, and may also be selected from a monomer of acrylate or methacrylate having an appropriate pendant side chain.

The molar ratio of the first repeating unit to the second repeating unit may be from about 0.01 to about 10000:1, such as from about 1:1 to about 50:1, such as from about 2:1 to about 23:1, such as about 5:1.

The zwitterion moiety defined by $X-L_1-Z$ in the first repeating unit may be selected from the group consisting of:

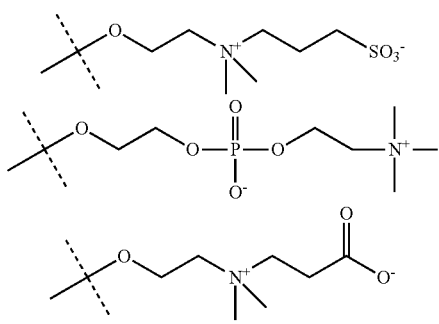

and salts or solvates thereof, where the dotted line represents the point of attachment to the rest of the molecule.

The anchoring moiety defined by $Y-L_2-A$ in the second repeating unit may be selected from the group consisting of:

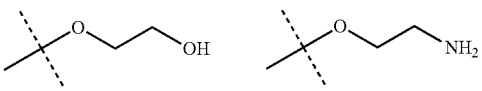

and salts or solvates thereof, where the dotted line represents the point of attachment to the rest of the molecule.

In some embodiments of the invention, the substrate may have a self-supporting hollow fiber configuration or a flat sheet configuration.

In some embodiments of the invention the membrane may have a water permeability value of from about 2.0 to about 10.0 L $m^{-2}$ $h^{-1}$ $bar^{-1}$ and/or a NaCl rejection value greater than about 97%.

Methods for Preparing Copolymers

The invention also provides methods for manufacturing the copolymers of the invention, which are useful in the composite membranes of the invention.

Thus, the third aspect of the invention provides a process for manufacturing a copolymer of the invention, the process comprising the steps of:
  reacting an aqueous mixture of a first monomer with a second monomer in the presence of an initiator to form the copolymer in a reaction vessel, wherein:
  the first monomer and second monomer are compatible monomers capable of forming a polymeric backbone with each other;
  the first monomer comprises zwitterionic functional groups;
  the second monomer comprises functional groups capable of forming a covalent bond (e.g. capable of forming a covalent bond with an acyl halide or the like).

The molar ratio of the first monomer to the second monomer may be from about 0.01 to about 10000:1, such as from about 1:1 to about 50:1, such as from about 2:1 to about 23:1, such as about 5:1.

In embodiments of this aspect of the invention:
(a) the mass ratio of the initiator to the total mass of the first and second monomers may be from about 1:2 to about 1:10000, such as from about 1:1 to about 1:1000, such as from about 1:10 to about 1:100, such as about 1:60; and/or
(b) the reaction temperature in step may be from about 30 to about 100° C., such as from about 50 to about 80° C., such as about 70° C.; and/or
(c) the reaction may be conducted for a period of from about 6 h to about 30 h, such as around 18 h.

The initiator may be any suitable initiator which is compatible with the first and second monomer, and can be a photoinitiator or a thermal initiator. Suitable initiators are known to a person skilled in the art and include azo compounds (such as azobisisobutyronitrile), organic peroxide compounds (such as di-tert-butyl peroxide, benzoyl peroxide and methyl ethyl ketone peroxide) and inorganic peroxide compounds (such as peroxydisulfate salts, e.g. ammonium persulfate). A particular initiator which can be used is ammonium persulfate.

The weight:weight ratio of the total weight of the monomers to water may be from about 1 to about 50 wt. %, such as from about 2 to about 25 wt. %, such as from about 5 to about 10 wt. %, such as around 7.2 wt. %.

The reaction may be quenched by cooling the reaction vessel.

The polymerization reaction may be performed using a water solvent. This allows for an environmentally friendly and easily scalable method which does not produce large quantities of harmful organic waste.

Methods for Preparing Membranes

The invention also provides methods for manufacturing the composite membranes of the invention.

Thus, the fourth aspect of the invention provides a process for manufacturing a composite membrane material of the invention, the process comprising the steps of:

(a) providing a thin film composite comprising a porous polymeric substrate material having a first and second surface and a thin film layer attached to the first surface of the substrate composed of a three dimensional polyamide network, the three dimensional polyamide network comprising a functional group suitable to form a covalent bond; and (b) providing a copolymer that has a polymeric backbone and comprises first and second repeating units, where the first repeating units provide the polymer with zwitterionic functional groups pendant to the polymeric backbone and the second repeating units provide the polymer with functional groups that are suitable to form a covalent bond with the thin film polyamide layer; and (c) contacting the thin film composite with a solution comprising the copolymer for a period of time sufficient to form a covalent bond between the three dimensional polyamide network and the copolymer.

The copolymer in the copolymer solution in step (c) typically has a concentration of from about 0.02 (wt./vol) % to about 7.2 (wt./vol) %, such as about 2.4 (wt./vol) %.

The period of time in step (c) may be from about 2 seconds to about 1 hour, such as from about 30 seconds to about 30 minutes, such as about 45 seconds to about 5 minutes, such as about 2 minutes.

After step (c), the composite membrane material may be exposed to a solution containing hypochlorite ion at around neutral pH for a period of time sufficient to obtain a membrane having improved flux and similar salt passage as compared to the same untreated membranes. The hypochlorite ion may be provided at a concentration of from about 200 to about 10,000 ppm, such as about 4,000 ppm in the hypochlorite solution. The period of time may be from about 0.5 h to about 10 h, such as about 6 h.

The composite membrane materials may be stored and transported in deionized water at a temperature of from 10 to 40° C. before use.

The copolymer may be provided by a process described hereinabove. In this case, the cooled reaction mixture containing the copolymer may be diluted to a concentration of from about 0.02 (wt./vol) % to about 7.2 (wt./vol) %, such as about 2.4 (wt./vol) % for use in step (c).

Liquid-Liquid Filtration

The present invention also provides a method of liquid-liquid filtration using a composite membrane material according to the invention.

The method of liquid-liquid filtration may be reverse osmosis, loose reverse osmosis, nanofiltration or ultrafiltration. The method may use a pressure (e.g. transmembrane pressure) of from about 1 bar to about 50 bar, such as from about 1 bar to about 20 bar.

Suitable water sources for use in the method of reverse osmosis or loose reverse osmosis include fresh water, synthetic brackish water, and waste water retentate.

The below Examples illustrate the invention and are not to be construed as limitative.

EXAMPLES

Example 1: Synthesis of Copolymers

Copolymers were synthesized via the free radical copolymerization of zwitterionic monomers (e.g. sulfobetaine methacrylate, SBMA) and anchoring monomers (e.g. hydroxyl ethyl methacrylate, HEMA) in water (Scheme 1).

1.44 g of monomers with different SBMA and HEMA ratios was dissolved in 18.56 g ultrapure water. Then 0.024 g ammonium persulfate was added into the mixture before purging with argon for 2 min. The polymerization was conducted at 70° C. for 18 h. Polymers having three different SBMA and HEMA ratios were prepared as listed in Table 1.

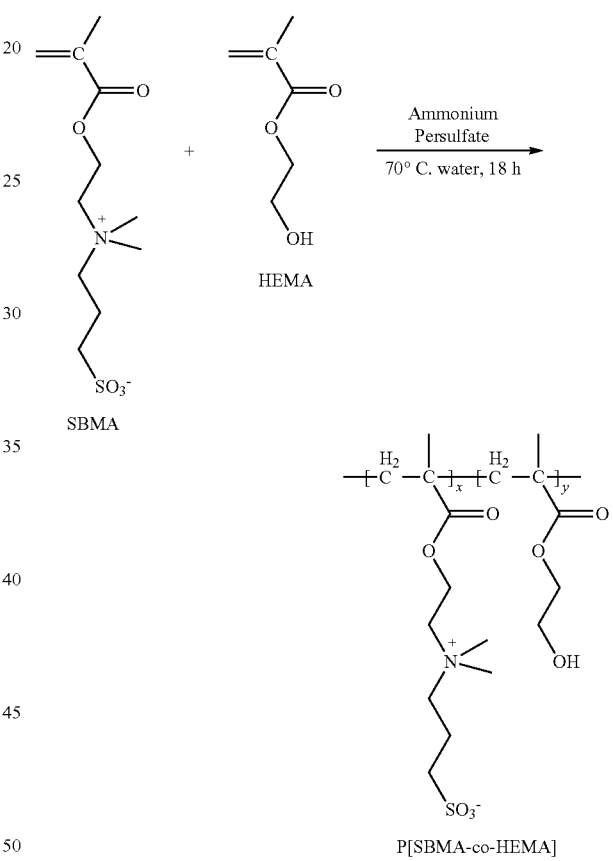

Scheme 1. Structure and synthetic route for copolymer P[SBMA-co-HEMA]

TABLE 1

Summary of the synthesis conditions of P[SBMA-co-HEMA].

| Copolymer ID | Monomer composition (SBMA/HEMA, wt. %) |
|---|---|
| COP1 | 6.9/0.3 |
| COP2 | 6.0/1.2 |
| COP3 | 3.6/3.6 |

The atomic mass concentrations of different P[SBMA-co-HEMA] copolymers are provided in Table 2 below. COP1 has the highest nitrogen and sulfur concentrations, indicating a relatively high zwitterion concentration.

FTIR spectra of COP1, COP2 and COP3 copolymers are shown in FIG. 1. The strong peak at 1714 cm$^{-1}$ is associated with the —O—C═O stretching vibration in the ester carbonyl groups of both SBMA and HEMA, the intensity of which is assumed as a constant for all three copolymers. The appearance of strong peaks at 1033 cm$^{-1}$ and 1150 cm$^{-1}$ is attributed to the symmetric stretching of SO$_3^-$ group and the peak at 1472 cm$^{-1}$ corresponds to the quaternary ammonium, which confirm the presence of SBMA segments in the copolymer. The presence of HEMA is confirmed by the broad —OH stretching peak at 3400 cm$^{-1}$. All these results confirm the successful synthesis of P[SBMA-co-HEMA] copolymers. With reference to the ester carbonyl peak, the percentages of quaternary ammonium and C—SO$_3^-$ peaks are reduced, while the —OH peak ratio is enhanced when decreasing the molar ratio of SBMA to HEMA from 23:1 to 1.1. This further confirms the highest zwitterionic group concentration for copolymer COP1.

TABLE 2

X-ray photoelectron spectroscopy (XPS) analysis of atomic mass concentrations of P[SBMA-co-HEMA] copolymers.

| Copolymer ID | O (mass %) | N (mass %) | C (mass %) | S (mass %) |
| --- | --- | --- | --- | --- |
| COP1 | 28.26 | 3.85 | 59.20 | 8.69 |
| COP2 | 28.03 | 2.94 | 61.42 | 7.60 |
| COP3 | 29.56 | 1.78 | 61.58 | 4.09 |

Example 2: Fabrication of Membrane Support and Thin Film Composite Hollow Fiber Membranes for Reverse Osmosis Polyethersulfone (PES) hollow fiber supports were prepared by a dry-jet wet-spinning process as described in US Patent application publication 2016-0121533. The as-spun hollow fibers were soaked in water for 2 days and then posted in a 50/50 wt. % glycerol/water solution for another 2 days. After air drying, these hollow fibers were loaded into a perfluoroalkoxy tubing connected with two Swagelok stainless steel male run tees. The polyamide selective skin was formed on inner surface of the PES hollow fiber support via an interfacial polymerization reaction between m-phenylenediamine (MPD) and trimesoyl chloride (TMC). The hollow fiber module was connected to clean tubes first and then the MPD solution (2 wt. % MPD and 0.1 wt. % sodium dodecyl sulfate in deionised water) was pumped through the lumen side of the fibers for 3 min. The excess water droplets on the inner surface were removed by continuous air blow for 5 min. Subsequently, a 0.15 wt. % TMC/hexane solution was pumped through the lumen side for 5 min. The resultant membranes were purged with air blow for 1 min to remove the excess hexane. The membranes obtained as such were labelled as TFC (i.e. thin film composite).

For antifouling modifications, a 2.4 wt. % solution of the copolymers prepared according to Example 1 was brought into contact with the nascent polyamide layer for 2 min. The membranes obtained were referred to as TFC-COP1, TFC-COP2 and TFC-COP3, respectively. Finally, all the resulting composite membranes were air dried for 1 day and then stored in deionised water before characterization, post-treatments and reverse osmosis testing.

Figure 2:
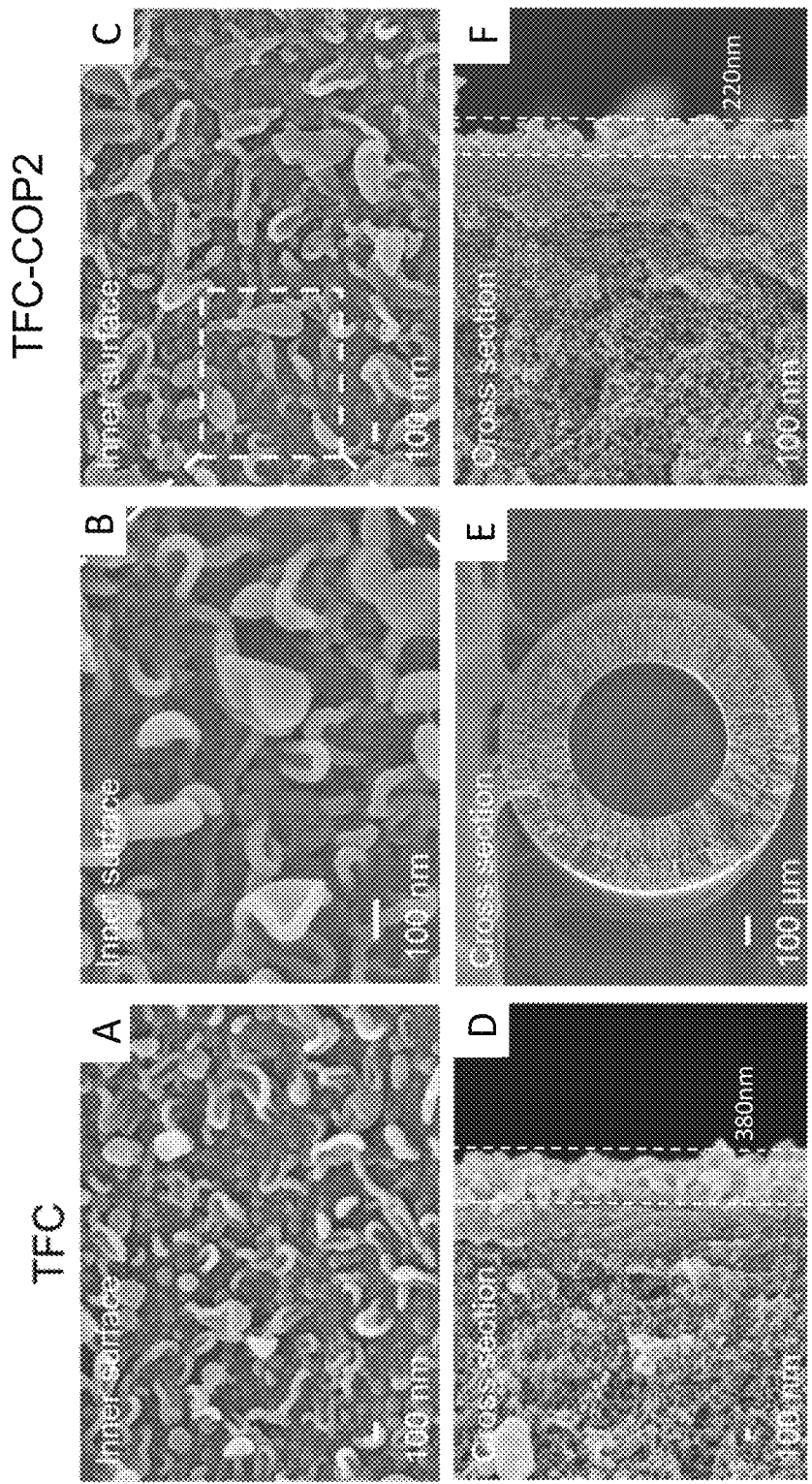
FIG. 2 shows Field Emission Scanning Electron Microscope (FESEM) images of the pristine thin film composite (TFC) and modified TFC-COP2 conjugate membranes prepared according to Example 2. Images A and D show images of the inner surface and cross section, respectively, of the TFC membrane. Images C and F show images of the inner surface and cross section of the TFC-COP2 conjugate membrane, while B and E show expanded versions of these images.

Field Emission Scanning Electron Microscope (FESEM) images of the inner surface and cross section of the pristine TFC and TFC-COP2 membranes are shown in FIG. 2. A thick and rough ridge-and-valley structure can be found on the inner surface the pristine TFC membrane. TFC-COP2 also demonstrates a similar surface structure. However, surface pores with diameter of 10 to 50 nm can be observed on the magnified inner surface of TFC-COP2. The formation of these nanopores can be attributed to the introduction of the antifouling copolymers, which may (1) quench the interfacial polymerization between MPD and TMC and, (2) remove the nascent and unstable structures on the top of the as-formed polyamide layer. The rougher and thinner cross section of the modified TFC membrane further confirms our hypothesis. The presence of these nanopores on the surface of polyamide layer may assist the penetration of the antifouling copolymer beneath the top surface layer, providing more stable anchoring of the antifouling copolymers. Furthermore, the mass transport resistance can be reduced for higher water flux.

Figure 3:
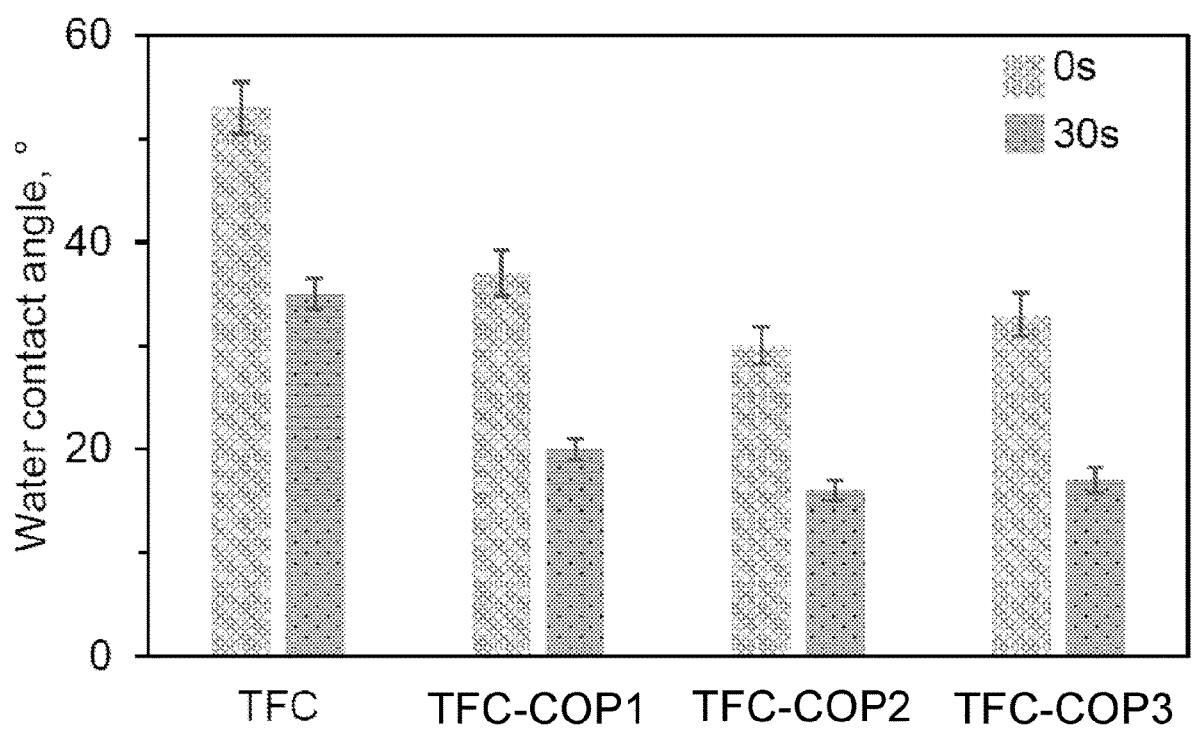
FIG. 3 shows average water contact angles of the pristine TFC and modified TFC-COP1, TFC-COP2 and TFC-COP3 membranes measured at the instant of contact and 30 seconds after the contact as described in Example 3.

Example 3: Surface Hydrophilicity and Chemistry of the Reverse Osmosis Membranes FIG. 3 compares the average water contact angles at instant contact and 30 seconds after the contact of the pristine TFC and modified membranes. A lower water contact angle is correlated with higher surface hydrophilicity and higher wettability, which assist the formation of surface hydration layer. All the modified membranes demonstrate significantly decreased water contact angle, which can be attributed to the introduction of the zwitterionic functionalities on the modified membranes. TFC-COP2 has the smallest water contact angle, indicating the highest zwitterionic groups distribution on the membrane surface. The surface chemistry of the modified TFC membranes is further confirmed by XPS, as shown in Table 3. TFC-COP2 has the highest S atomic mass concentration, which is solely attributed to the SO$_3^-$ groups of the antifouling copolymers. Indeed, the density of the zwitterionic groups on the modified membrane surface is highly associated with the ratio between the zwitterionic and anchoring monomers. A lower concentration of the anchoring monomers may cause inhomogeneous and insufficient distribution of the copolymers on the polyamide layer. On the other hand, a lower concentration of the zwitterionic monomers may lead to the overall low density of zwitterionic functionalities on the surface of the modified membrane. The data suggests that COP2 has the most balanced zwitterionic monomers and anchoring monomers distribution, which provides a high number of bonding sites to the polyamide layer and zwitterionic functionalities.

TABLE 3

XPS analysis of atomic mass concentrations on the surface of different polyamide layers.

| Membrane | O (mass %) | N (mass %) | C (mass %) | S (mass %) |
| --- | --- | --- | --- | --- |
| TFC | 14.72 | 12.90 | 72.37 | 0.01 |
| TFC-COP1 | 25.84 | 5.56 | 66.26 | 2.34 |

TABLE 3-continued

XPS analysis of atomic mass concentrations on the surface of different polyamide layers.

| Membrane | O (mass %) | N (mass %) | C (mass %) | S (mass %) |
|---|---|---|---|---|
| TFC-COP2 | 25.59 | 6.14 | 64.85 | 3.43 |
| TFC-COP3 | 19.93 | 8.19 | 68.73 | 3.14 |

Figure 4A:
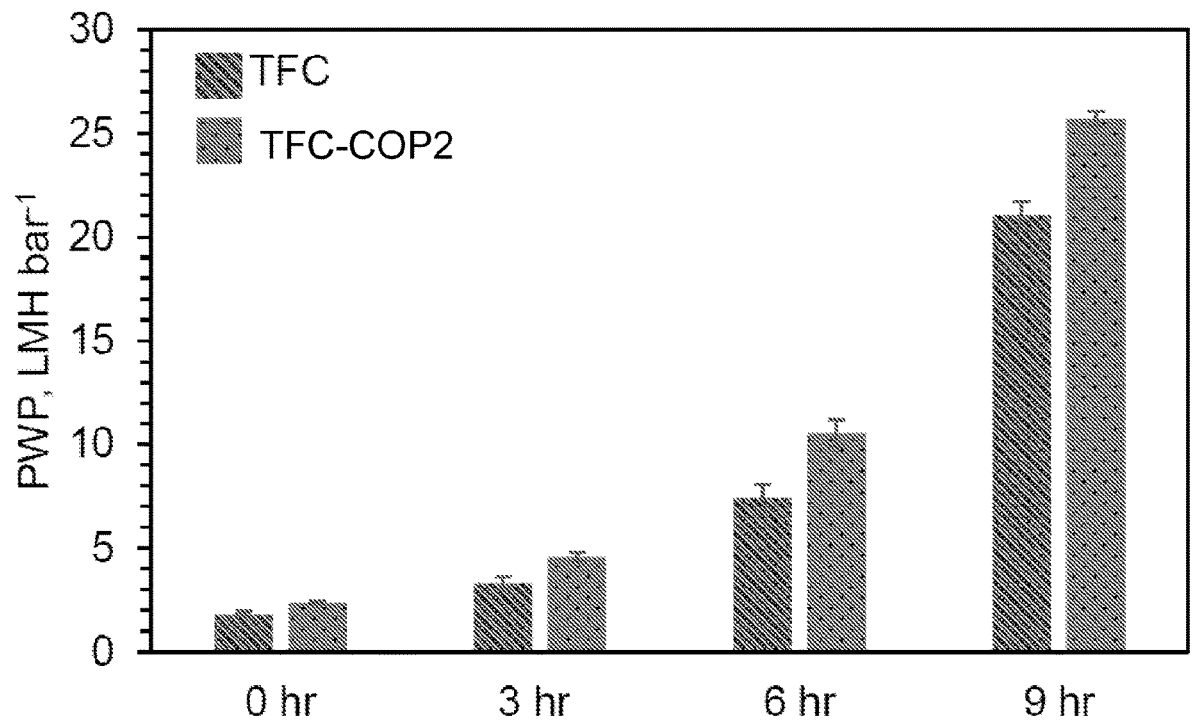
FIGS. 4a and 4b show the effect of NaOCl treatment duration on the pure water permeability (FIG. 4a) and salt rejection properties (FIG. 4b) of the TFC and TFC-COP2 membranes as described in Example 4.
Figure 4B:
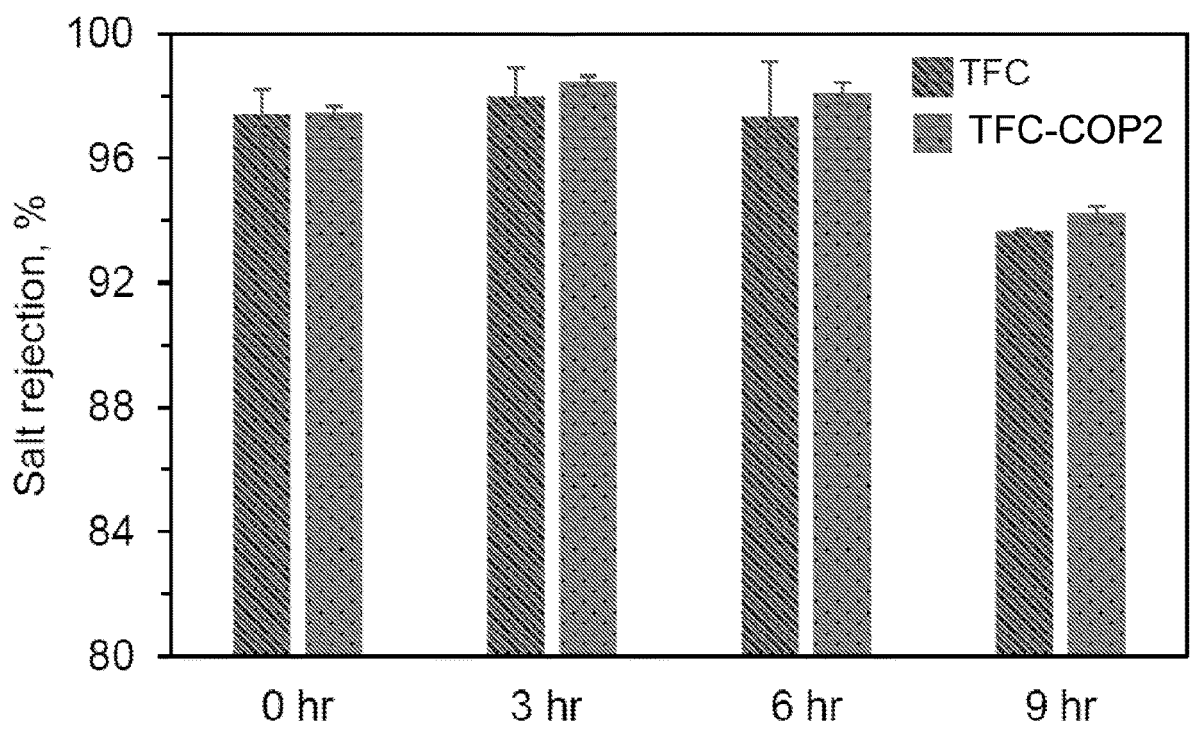

Example 4: Post-Treatment of the Reverse Osmosis Membranes, Reverse Osmosis Experiments, Water Permeability and Salt Rejection of the TFC Membranes The polyamide selective skin was further treated using sodium hypochlorite (NaOCl) to enhance the water permeability. For each treatment cycle, a 4000 ppm NaOCl aqueous solution was circulated on the membrane module lumen side for 3 hr and cleaned thoroughly with deionised water. The reverse osmosis tests were carried out at a transmembrane pressure of 10 bar, and the salt permeabilities were evaluated using a 1000 ppm NaCl solution. Prior to each test, all the membranes were conditioned under 12 bar. FIG. 4 shows the pure water permeability of the pristine TFC and TFC-COP2 membranes before and after the NaOCl treatment. The pristine TFC shows a water permeability of 1.79 LMH/bar whereas the modified TFC-COP2 membrane shows an enhanced water permeability of 2.36 LMH/bar. The salt rejections for both membranes are similar. After 3 h and 6 h NaOCl treatment, both membranes show a significantly enhanced water permeability. This can be attributed to the hydrolysis of the surface amide C—N bond induced by hypochlorite, which makes the membrane more hydrophilic. However, prolonged treatment duration, such as 9 h, may irreversibly degrade the polyamide layer, leading to a decreased salt rejection. With carefully controlled NaOCl treatment conditions, the membrane's water permeability could be tailored without sacrificing salt rejection.

Example 5: Fouling Tests Against Alginate and Bovine Serum Albumin (BSA)

Figure 5A:
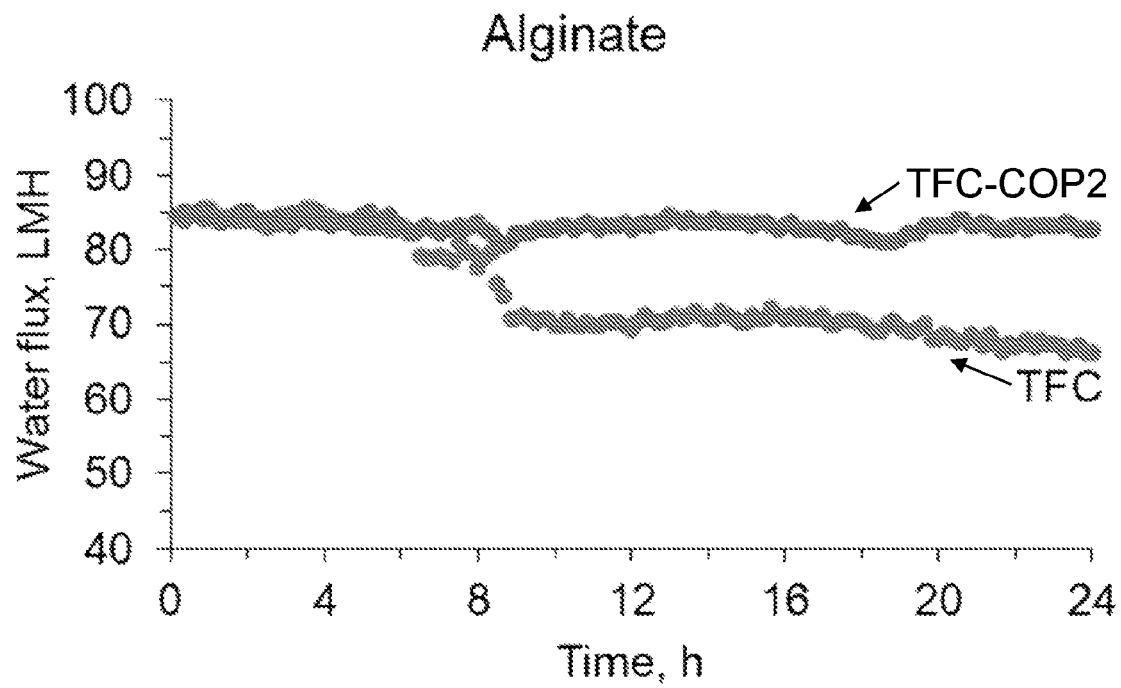
FIGS. 5a and 5b show the anti-fouling performance of the pristine TFC and TFC-COP2 membranes when tested against Alginate (FIG. 5a) and bovine serum albumin (FIG. 5b) as the feed solution as described in Example 5.
Figure 5B:
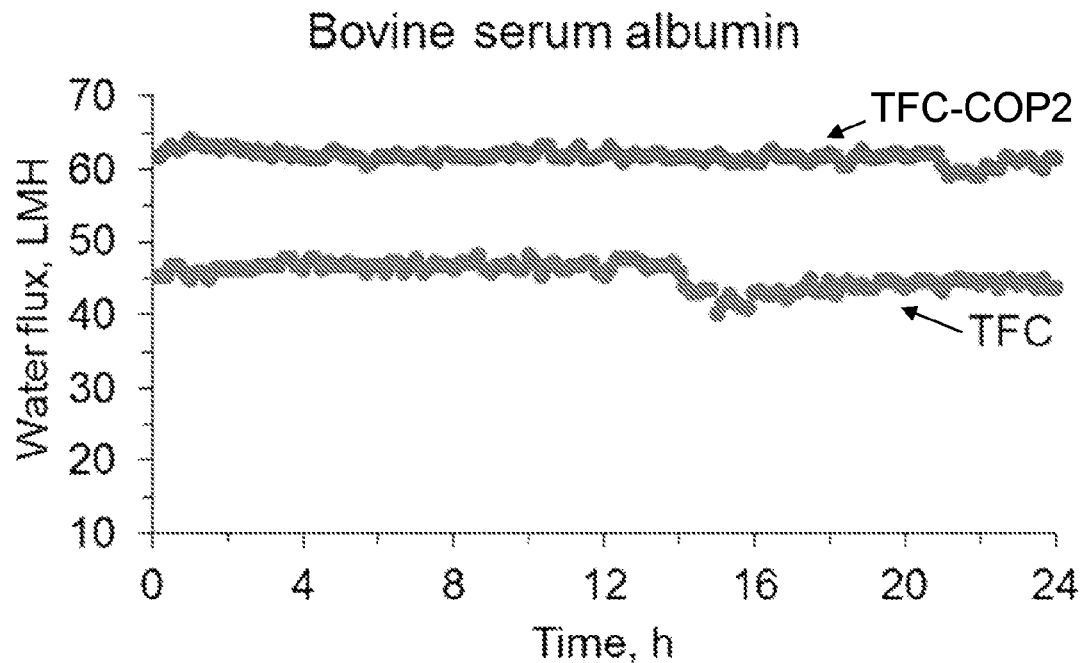

The fouling tests were conducted by firstly applying deionised water as the feed solution for 1 h to unify the initial water fluxes for both membranes, and then replacing it with the foulant solutions for 24 h. The alginate foulant solution contained 200 ppm sodium alginate and 1.5 mM $CaCl_2$) while the BSA foulant solution contained 1000 ppm bovine serum albumin protein. FIG. 5a presents the fouling behaviours of the pristine TFC and the TFC-COP2 membranes against alginate foulant solution in the reverse osmosis test. For the pristine TFC, a flat and stable water flux is observed for the first 6 h, which can be attributed to the competing mechanisms between the stabilizing effect under a high operating pressure and the scaling effect induced by the attachment of the alginate onto the TFC layer. However, after 6 h operation, the water flux decreases fast within the next 4 h and keeps decreasing in the later at a slightly lower rate. The final flux is around 65 LMH as compared to 85 LMH of the initial water flux. However, the modified TFC-COP2 membrane shows a stable water flux throughout the whole testing period, exhibiting highly antifouling properties. Similar phenomena are observed for the BSA fouling test, which is shown in FIG. 5b. It should be noted that the initial water flux rates in the BSA test were the same, but the pristine TFC membrane demonstrated an immediate flux drop when subjected to the highly concentrated BSA foulant solution, which may be due to the attachment and accumulation of BSA molecules onto the polyamide layer.

Figure 6:
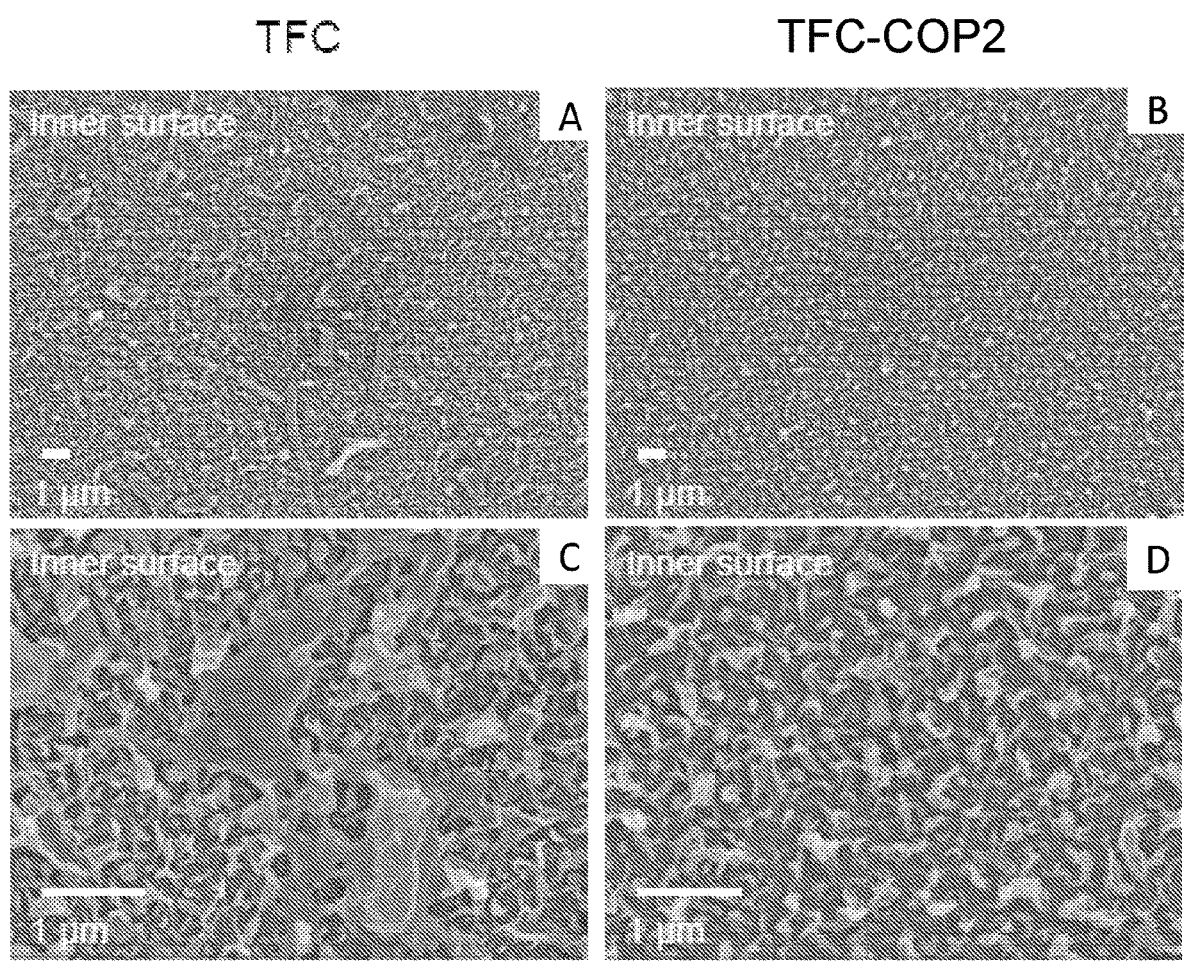
FIG. 6 shows FESEM images of the pristine thin film composite (TFC) and modified TFC-COP2 membranes after the BSA fouling test described in Example 5. Image A shows the TFC membrane surface before the fouling test, while foulant particles are visible on image C. Image B shows the TFC-COP2 membrane surface before the fouling test, and the membrane surface appears clean even after the fouling test (Image D).

FESEM images of the TFC and TFC-COP2 membranes after the BSA fouling test are shown in FIG. 6. It can clearly be seen that large foulant particles are present on the TFC membrane but no significant fouling can be seen on the TFC-COP2 membrane.

Example 6: Reverse Osmosis Test Using Realistic Feeds

Figure 7:
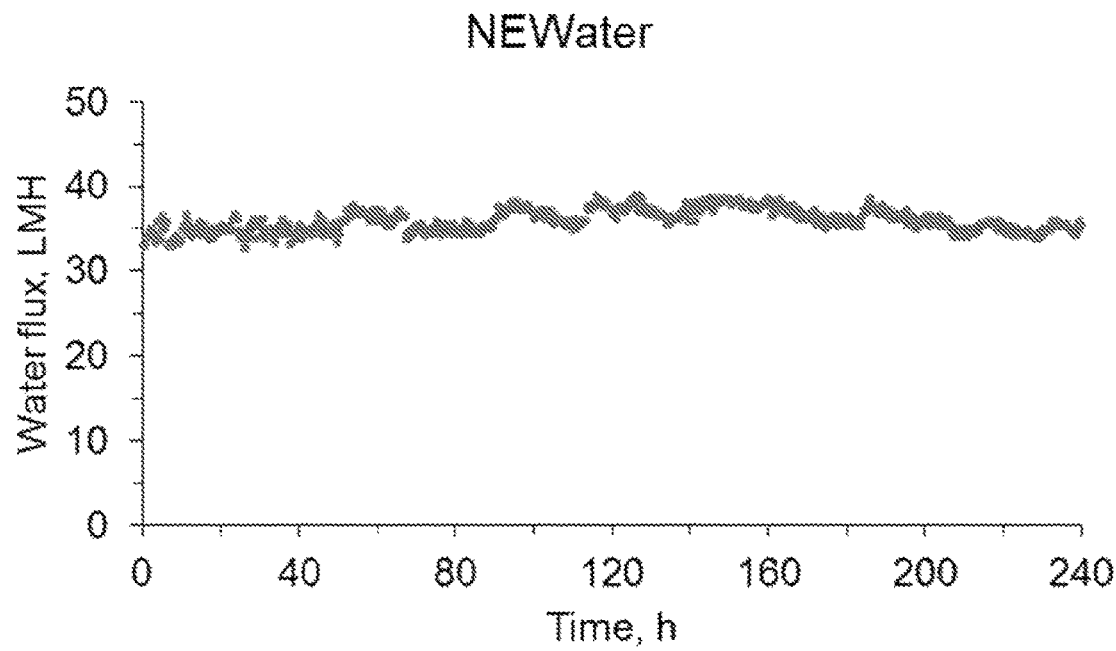
FIG. 7 shows the water flux rate of the TFC-COP2 membrane in a 240-hour reverse osmosis test using wastewater retentate as described in Example 6.

A 240-hour long reverse osmosis test was carried out using the wastewater retentate (WWRe) generated from Singapore local NEWater plants and the water flux is shown in FIG. 7. It can be seen that the membrane shows a relatively stable performance throughout the whole testing period. The small fluctuations of water flux are mainly due to the variations in feed concentration, feed water flow rate and testing pressure. In summary, no fouling phenomena are observed, indicating the sustainable and stable operation performance of the newly developed antifouling TFC membranes for waste water treatment. The water qualities of the realistic feed and reverse osmosis membranes permeates are listed in Table 4. In general, the modified TFC membrane shows similar filtration performance as compared to the pristine TFC membrane. However, it is evident that the modified TFC membrane is more effective at removing small ions from the retentate.

TABLE 4

Ion concentrations (ppm) of original WWRe from the NEWater plant and the WWRe filtrate treated by the pristine TFC and modified TFC membranes.

| Sample ID | $Na^+$ | $K^+$ | $Mg^{2+}$ | $Ca^{2+}$ | $F^-$ | $Cl^-$ | $SO_4^{2-}$ | $NO_3^-$ | $PO_4^{2-}$ |
|---|---|---|---|---|---|---|---|---|---|
| Original WWRe | 137.6 | 47.2 | 6.1 | 63.7 | 1.3 | 181.6 | 96.9 | 210.0 | 22.3 |
| WWRe TFC filtrate | 10.5 | 3.1 | 0 | 1.0 | 0.1 | 6.8 | 0.2 | 26.0 | 0 |
| WWRe TFC-COP2 filtrate | 9.5 | 2.8 | 0 | 1.1 | 0.1 | 7.1 | 0.4 | 24.2 | 0 |

Example 7: Comparison of Various Modified Membranes

TFC membranes were prepared as described in Example 2. The membranes were modified by running various species through the membrane after interfacial polymerisation. Membranes were contacted with water, HEMA (anchoring) monomers, copolymers COP2 and COP3 and polyamidoamine (PAMAM) G2 dendrimers.

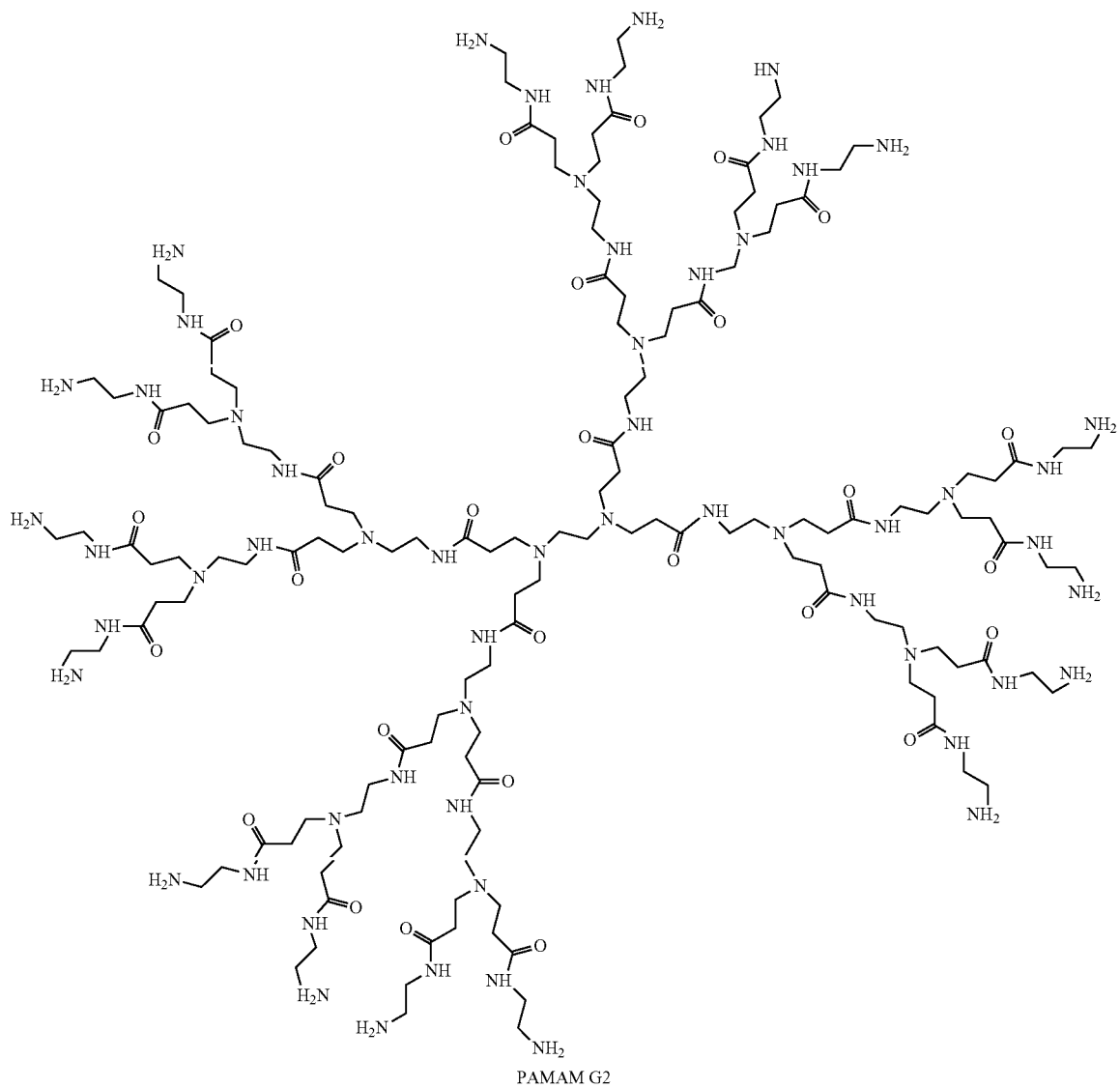 [SMILES: NCCNC(=O)CCN(CCNC(=O)CCN(CCNC(=O)CCN(CCC(=O)NCCN(CCC(=O)NCCN(CCC(=O)NCCN)CCC(=O)NCCN)CCC(=O)NCCN(CCC(=O)NCCN)CCC(=O)NCCN)CCN(CCC(=O)NCCN(CCC(=O)NCCN(CCC(=O)NCCN)CCC(=O)NCCN)CCC(=O)NCCN(CCC(=O)NCCN)CCC(=O)NCCN)CCC(=O)NCCN(CCC(=O)NCCN(CCC(=O)NCCN)CCC(=O)NCCN)CCC(=O)NCN(CCC(=O)NCCN)CCC(=O)NCCN)CCC(=O)NCCN(CCC(=O)NCCN)CCC(=O)NCCN)CCC(=O)NCCN]

PAMAM G2

Figure 8:
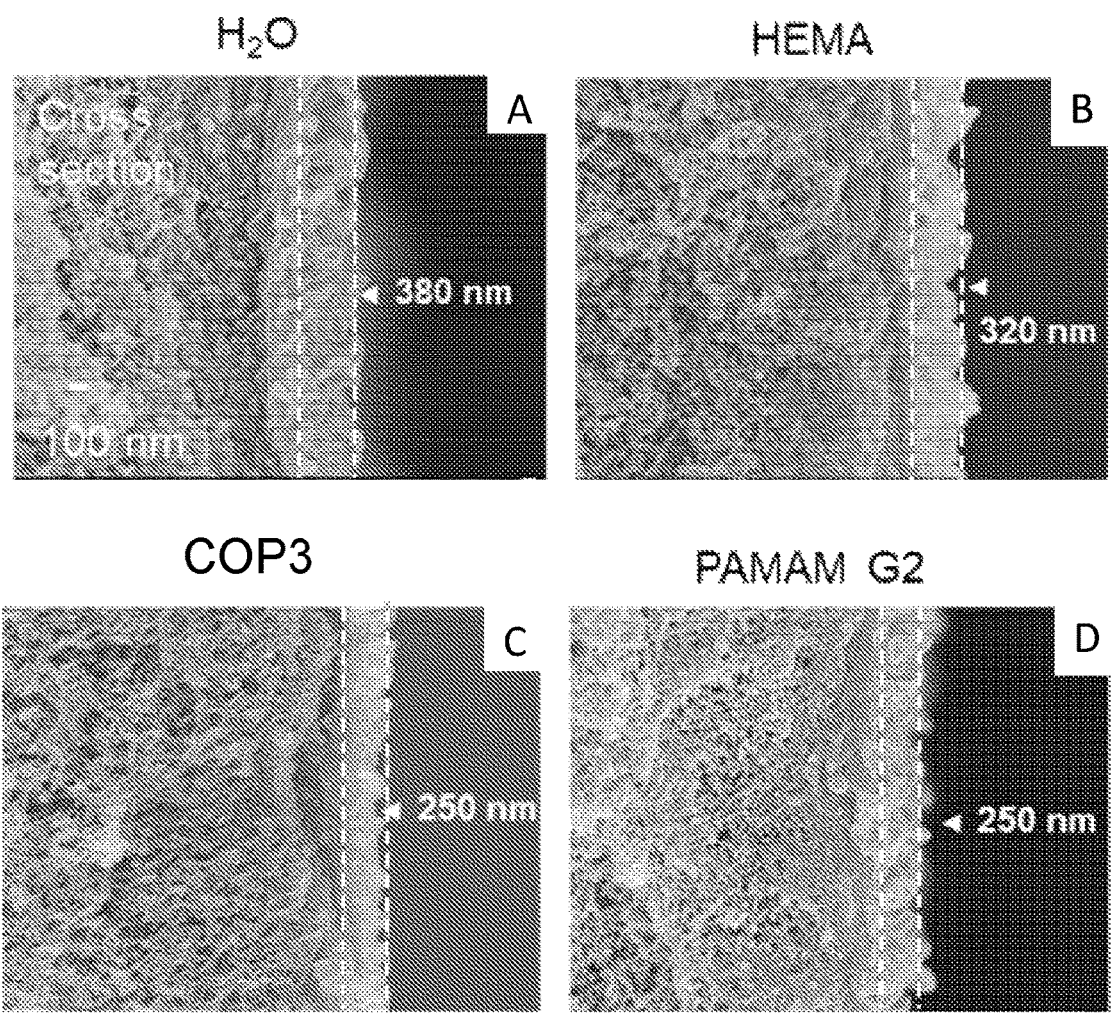
FIG. 8 shows the thickness of the polyamide layer in the thin film composite membranes which have been modified by $H_2O$ (A), HEMA (B), COP3 (C) and PAMAM G2 (D), as discussed in Example 7.
Figure 9A:
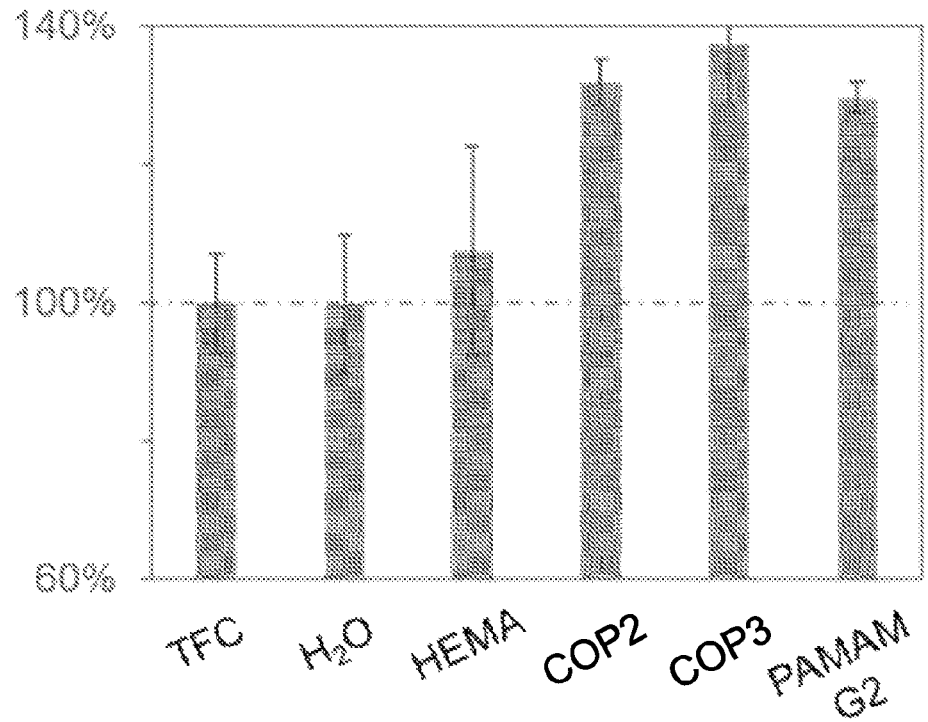
FIGS. 9a and 9b show the water permeability and NaCl rejection properties for the thin film composites discussed in Example 7.
Figure 9B:
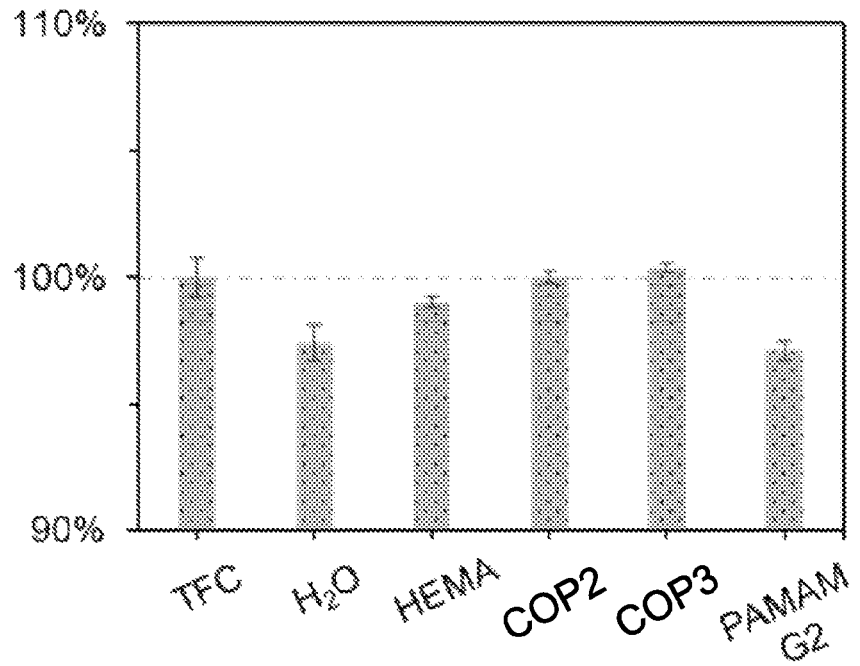
Figure 10A:
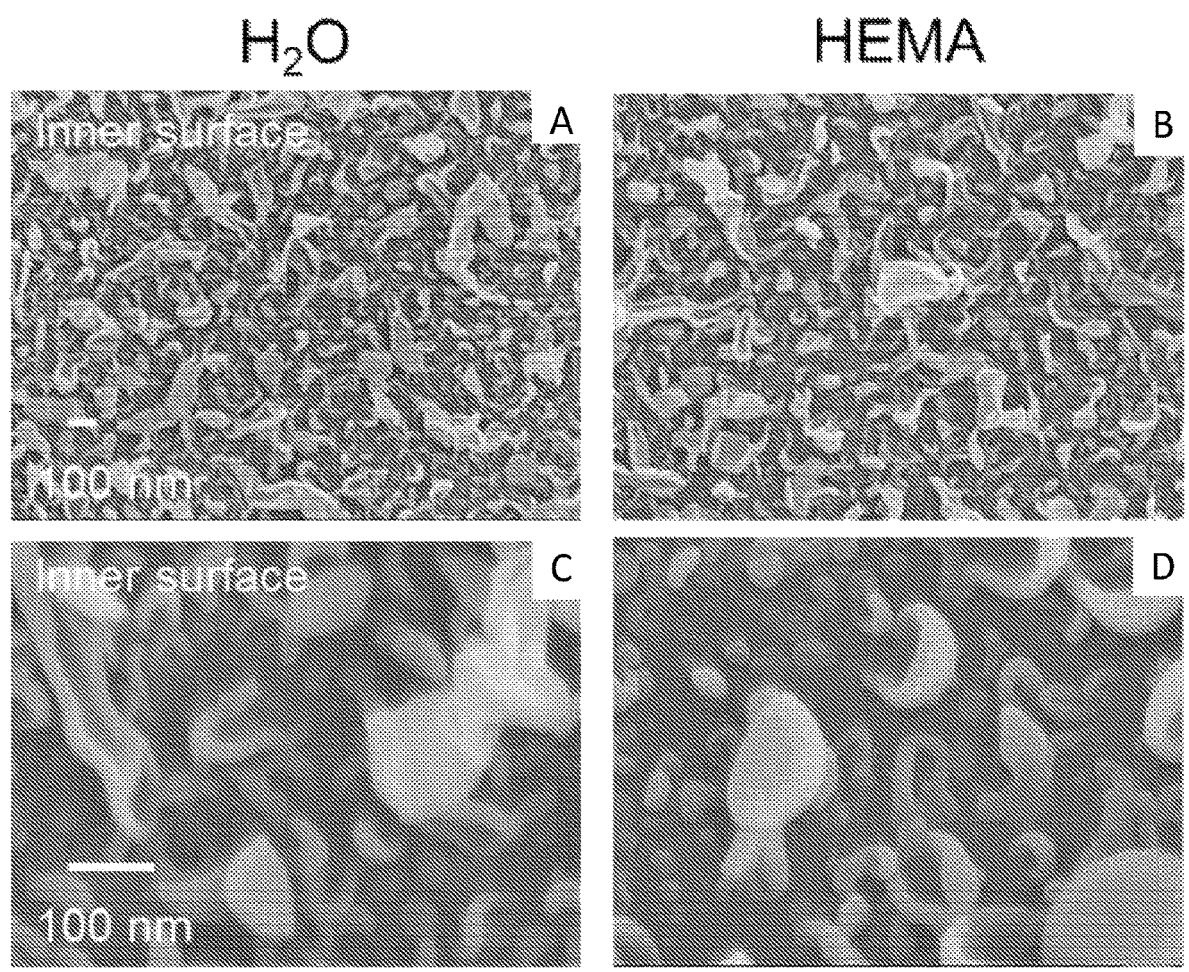
FIGS. 10a and 10b show SEM images of the surface of the membranes modified by $H_2O$ (A and C), HEMA (B and D), COP3 (E and G) and PAMAM G2 (F and H), as discussed in Example 7.
Figure 10B:
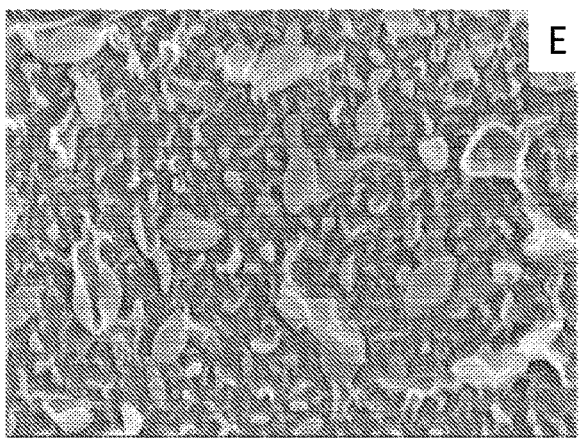
Figure 10B:
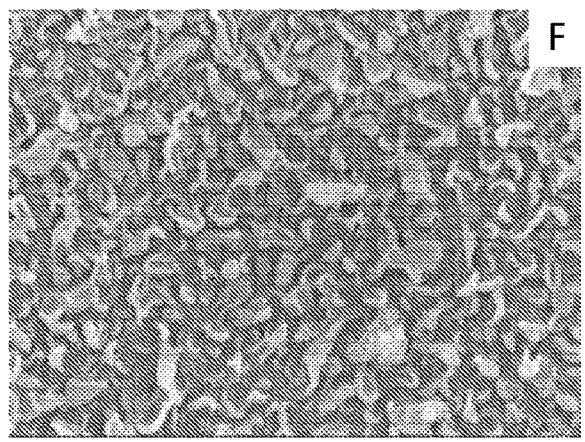
Figure 10B:
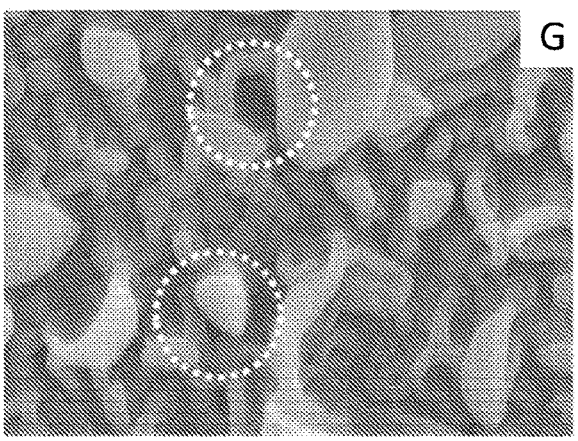
Figure 10B:
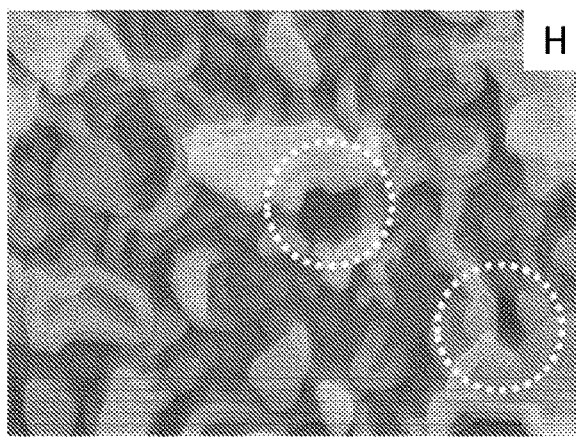

The thickness of the three dimensional polyamide network for each of these modified membranes is shown in FIG. 8. Results of the pure water permeability and salt rejection tests (transmembrane pressure: 10 bar; feed: deionised water/1000 ppm NaCl) are shown in FIGS. 9a and 9b. FESEM images of the surface of each modified membrane are shown in FIG. 10. The effect of each type of modification is discussed below.

Water Modification

FIG. 8 shows that the thickness of the polyamide layer remains the same as the original TFC membrane. This is likely due to the fact that water reacts fast with acyl chloride to produce HCl. HCl dissolves in water immediately or escapes into the air as vapour, without the ability to drag away any molecules from the membrane.

The thickness (FIG. 8) and permeability (FIG. 9a) of the membrane hence remains unchanged. Meanwhile, the introduction of water into the membrane appears to prevent the interfacial polymerization (formation of the three dimensional polyamide network) from proceeding to completion (i.e. the water quenches the polymerisation reaction). This leads to incomplete network formation and reduced salt rejection, which is evident from FIG. 9b.

HEMA Modification

When anchoring HEMA monomers are used instead, the OH groups in the HEMA monomers covalently bond with residual activated carboxylic acid groups on the polyamide network. Bonding between HEMA monomers and loose polyamide chains causes the chains to be pulled from the network away into solution. This "molecular drilling" lowers the thickness of the three dimensional polyamide network from approx. 380 nm to approx. 320 nm (FIG. 8), and the water permeability increases accordingly (FIG. 9a).

However, due to the small size and mono-functionality of the monomers, no additional polymer network can be formed on top of the three dimensional polyamide network, and hence the salt rejection is lower than the original TFC membrane. Without wishing to be bound by theory, this is believed to be due to the reduced thickness of the three dimensional polyamide network.

COP2/COP3 Modification

In contrast, the COP2/COP3 copolymers result in simultaneous enhancement of the water permeability and salt rejection. The COP2/COP3 polymers can drill nanopores on the surface of the polyamide network by the mechanism described above for HEMA (nanopores are visible in FIG. 10, image G). The COP2/COP3 polymers can also decrease the thickness of the three dimensional polyamide network by the same mechanism (FIG. 8).

In addition, the COP2/COP3 copolymers can covalently bond to the remaining three dimensional polyamide network, forming a polymer network on top of the polyamide. This may result in a more solid network, that improves the salt rejection properties of the membrane without reducing water flux rates. Without wishing to be bound by theory, this is believed to be due to the structure of the polymer network.

PAMAM G2 Modification

When PAMAM G2 dendrimers are introduced, the water permeability is increased while the NaCl rejection decreases. PAMAM G2 is rich in amine groups, which are more nucleophilic than hydroxy groups, and therefore more reactive to residual acyl chloride groups on the polyamide. Without wishing to be bound by theory, it is believed that the increased reactivity of PAMAM G2 may produce nanopores that are too large to heal by bonding. The SEM images in FIG. 10 suggest that the nanopores on the PAMAM G2 modified surface are 50-100 nm in diameter, which are significantly larger than those drilled by the hydroxyl groups in COP3. These larger nanopores may be the cause of the increased permeability and reduced NaCl rejection.

These results suggest that when the polyamide network comprises residual acyl chloride groups, the use of anchoring moieties comprising OH groups may result in improved salt rejection when compared to $NH_2$ groups.

Figure 11:
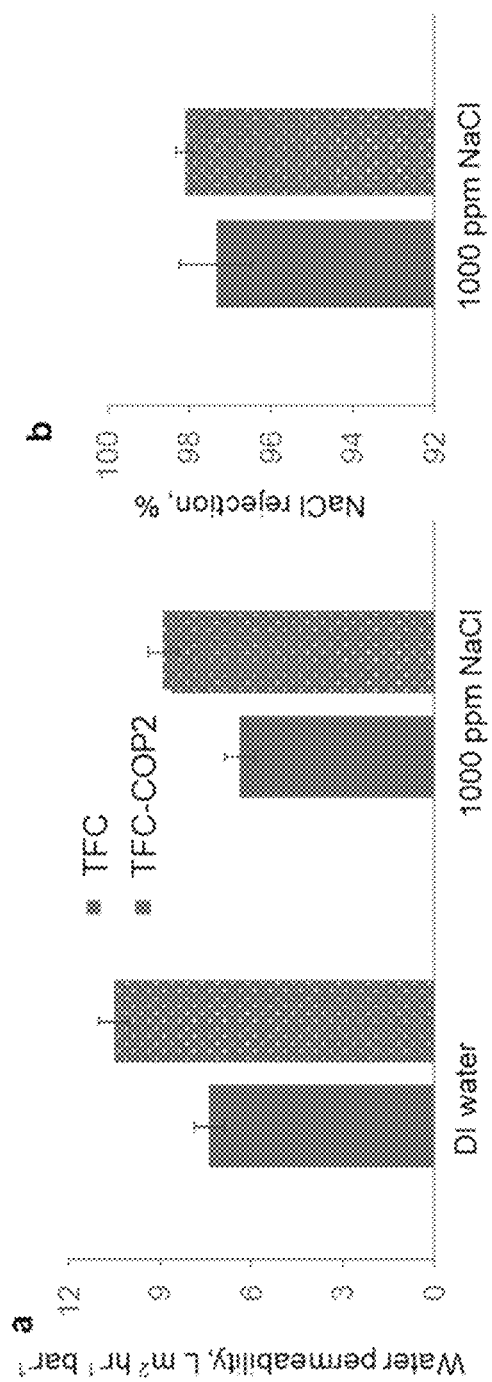
FIG. 11 shows water permeability and NaCl rejection for the TFC and TFC-COP2 membranes.

Example 8: Comparison of Water Permeability for Deionised Water and NaCl Solution The original TFC and TFC-COP2 modified hollow fiber membranes were tested in the reverse osmosis process at 10 bar. As shown in FIG. 11, when deionized water is used as the feed, the modified membrane showed a pure water permeability of 10.5±0.5 $L\ m^{-2}\ h^{-1}\ bar^{-1}$, which is 42% higher than that of the original membrane. By replacing the feed with 1000 ppm NaCl solution, the water permeabilities for both membranes drop to ~80% of the pure water counterpart, primarily due to the higher osmotic pressure in the salt solution. The NaCl rejection of the modified membranes is 98±0.2%, comparable to the original unmodified membrane.

The water permeability of the modified membrane is 2 to 3 times higher than for membranes reported in the literature which achieve a similar NaCl rejection rate (see those reported in D. Cohen-Tanugi et al., Energy Environ. Sci., 2014, 7, 1134-1141; Y. Zhao et al., J. Membr. Sci. 423-424 (2012) 422-428; K. Duan et al., J Membr. Sci. 473 (2015) 157-164.)

The scanning electron microscopy (SEM) images in FIG. 2 provide explanations for the increased water permeability. While the apparent thickness of the polyamide layer in the original TFC membrane reaches 380 nm, it is significantly reduced by 42% to 220 nm after modification by COP2 polymers. The extent of membrane thinning generally corresponds to the degree of permeability enhancement. The COP2 modified membrane also has nanopores on its surface in the size range of 10-50 nm, which can further remove the water transport barrier and loosen the structure in the selective layer for faster water permeation. Without wishing to be bound by theory, it is believed that by reacting with the acyl chloride groups on membrane surfaces, the copolymer of the invention is able to drag away loose polyamide chains and even networks into the solution, reducing the membrane thickness and drilling nanopores that facilitate higher water permeation rate. On the other hand, the polymers can still attach to the firm polyamide on the surface through the covalent bonding, possibly creating additional crosslinked polymer networks within the layer to maintain the salt rejection capability.

The invention claimed is:

1. A composite membrane material suitable for liquid-liquid filtration comprising:
    a porous polymeric substrate material having a first and second surface;
    a thin film layer attached to the first surface of the substrate composed of a three dimensional polyamide network formed by a reaction of a compound comprising two or more activated carboxylic acid groups and a compound comprising two or more amino groups; and
    a copolymer covalently attached to the thin film layer, wherein:
    the copolymer has a polymeric backbone and comprises first and second repeating units, where the first repeating units provide the polymer with zwitterionic functional groups pendant to the polymeric backbone and the second repeating units provide the polymer with functional groups suitable to form a covalent bond with the three dimensional polyamide network;
    the thin film layer has a thickness of from 1 to 10000 nm;
    the copolymer has formula (I):

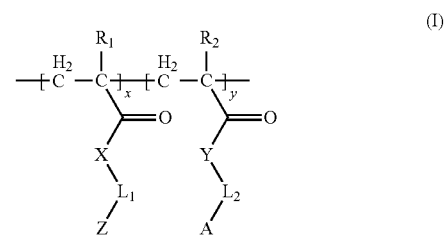

where:
x represents the first repeating unit and y represents the second repeating unit, where the molar ratio of repeating unit x to repeating unit y is from 0.01 to 10000:1;
$R_1$ and $R_2$ are independently H or $C_{1-6}$ alkyl;
X and Y are independently NH, O or S;
$L_1$ and $L_2$ are independently a $C_{1-6}$ alkylene group;
Z is a zwitterionic group; and
A is an anchoring group selected from OH.

2. The membrane according to claim 1, wherein the substrate material is selected from polyethersulfone, polysulfone, polyphenylsulfone, polyacrylonitrile, polyimide, polyether imide, polyamide-imde, polyvinylidene fluoride, cellulose triacetate, polyetherketone, or polyetheretherketone.

3. The membrane according to claim 1 wherein the three dimensional polyamide network is formed from a polyamide material which is an aliphatic and/or aromatic polyamide.

4. The membrane according to claim 3, wherein the compound comprising two or more amino groups is m-phenylenediamine and the compound comprising two or more activated carboxylic acid groups is trimesoyl chloride.

5. The membrane according to claim 1, wherein the membrane has a water permeability value of from 2.0 to 10.0 $L\ m^{-2}\ h^{-1}\ bar^{-1}$ and/or a NaCl rejection value greater than 97%.

6. The membrane according to claim 1, wherein the copolymer is a random copolymer or a block copolymer.

7. The membrane according to claim 1, wherein the first repeating unit is selected from a monomer of acrylate or methacrylate, with a pendant side-chain that comprises a zwitterionic functional group selected from the group consisting of sulfobetaine, carboxybetaine, sulfopyridinium betaine, phosphorylcholine, cysteine, sulfobetaine siloxane.

8. The membrane according to claim 1, the second repeating unit is selected from a monomer of acrylate or methacrylate, with a pendant side-chain that comprises a functional group selected from OH.

9. The membrane according to claim 1, wherein the molar ratio of the first repeating unit to the second repeating unit is from 0.01 to 10000:1.

10. The membrane according to claim 1, wherein:
    (a) the zwitterion moiety defined by X-L$_1$-Z in claim 1, is selected from:

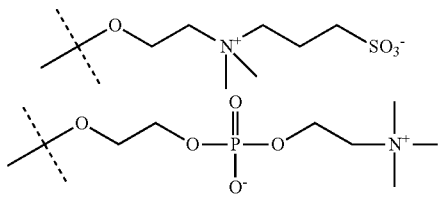

-continued

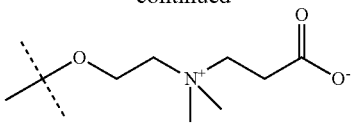

and salts or solvates thereof, where the dotted line represents the point of attachment to the rest of the molecule; and/or (b) the anchoring moiety defined by Y-L$_2$-A in claim 1, is selected from:

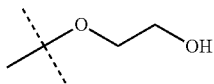

and salts or solvates thereof, where the dotted line represents the point of attachment to the rest of the molecule.

11. The membrane according to claim 1, wherein the substrate has a self-supporting hollow fiber configuration or a flat sheet configuration.

* * * * *